United States Patent
Inuzuka et al.

(10) Patent No.: US 6,764,243 B1
(45) Date of Patent: Jul. 20, 2004

(54) SPLIT BOOTS AND METHOD OF CONNECTING THE BOOTS, DEPOSITING AGENT, AND HEATING BODY

(75) Inventors: Yasuaki Inuzuka, Ogasa-cho (JP); Yoshifumi Kojima, Fujisawa (JP); Hiromitsu Yamoto, Fujisawa (JP); Yukihisa Tateishi, Fujisawa (JP); Kenichi Fujimoto, Fujisawa (JP); Kazuhiko Fujimoto, Fujisawa (JP); Atsushi Nagashima, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/700,715

(22) PCT Filed: Aug. 3, 1999

(86) PCT No.: PCT/JP99/04187

§ 371 (c)(1),
(2), (4) Date: Nov. 27, 2000

(87) PCT Pub. No.: WO00/08361

PCT Pub. Date: Feb. 17, 2000

(30) Foreign Application Priority Data

Aug. 4, 1998 (JP) .......................................... 10/220649
Sep. 17, 1998 (JP) .......................................... 10/263409
Feb. 12, 1999 (JP) ............................................ 11/33833

(51) Int. Cl.⁷ .............................. F16J 3/04; F16J 15/52
(52) U.S. Cl. ........................ 403/50; 403/134; 403/270; 277/634
(58) Field of Search ................................. 156/110.1, 60, 156/272.2, 304.6, 305, 349, DIG. 51; 277/634, 635, 636; 403/134, 270–272, 265, 50–51; 464/173, 175, 17; 219/535; 29/454

(56) References Cited

U.S. PATENT DOCUMENTS

| | | | |
|---|---|---|---|
| 3,766,079 A | * | 10/1973 | Jackman et al. |
| 4,067,313 A | * | 1/1978 | Donnelly ..................... 126/263 |
| 4,558,869 A | | 12/1985 | Grove et al. ................... 277/1 |
| 5,222,746 A | | 6/1993 | Van Steenbrugge ... 277/212 FB |
| 5,833,542 A | * | 11/1998 | Harrold et al. ............. 464/175 |
| 6,171,010 B1 | * | 1/2001 | Nagashima et al. .......... 403/51 |
| 6,322,085 B1 | * | 11/2001 | Martin et al. ........... 277/634 X |

FOREIGN PATENT DOCUMENTS

| | | |
|---|---|---|
| JP | 63-184212 | 7/1988 |
| JP | 5-49542 | 3/1993 |
| JP | 5-83532 | 11/1993 |
| JP | 5-296349 | 11/1993 |
| JP | 10-184913 | 7/1998 |

* cited by examiner

Primary Examiner—Gregory J. Binda
Assistant Examiner—Ryan M. Flandro
(74) Attorney, Agent, or Firm—Jacobson Holman PLLC

(57) ABSTRACT

A protruding part formed on one split end part of a boot is temporarily fixed to a recessed part formed on the other split end part in the state where step-shaped hook portions formed on one-end thereof are engagingly locked to each other, and connected by welding, fusion or adhesion. The protruding part is hooked only in one thickness directional side. An overlapping protruding part formed on the non-hook side (inner side) of the recessed part is connected extending over the inside surface of the protruding part and the inside surface of the split end part continued thereto.

13 Claims, 19 Drawing Sheets

F I G. 1
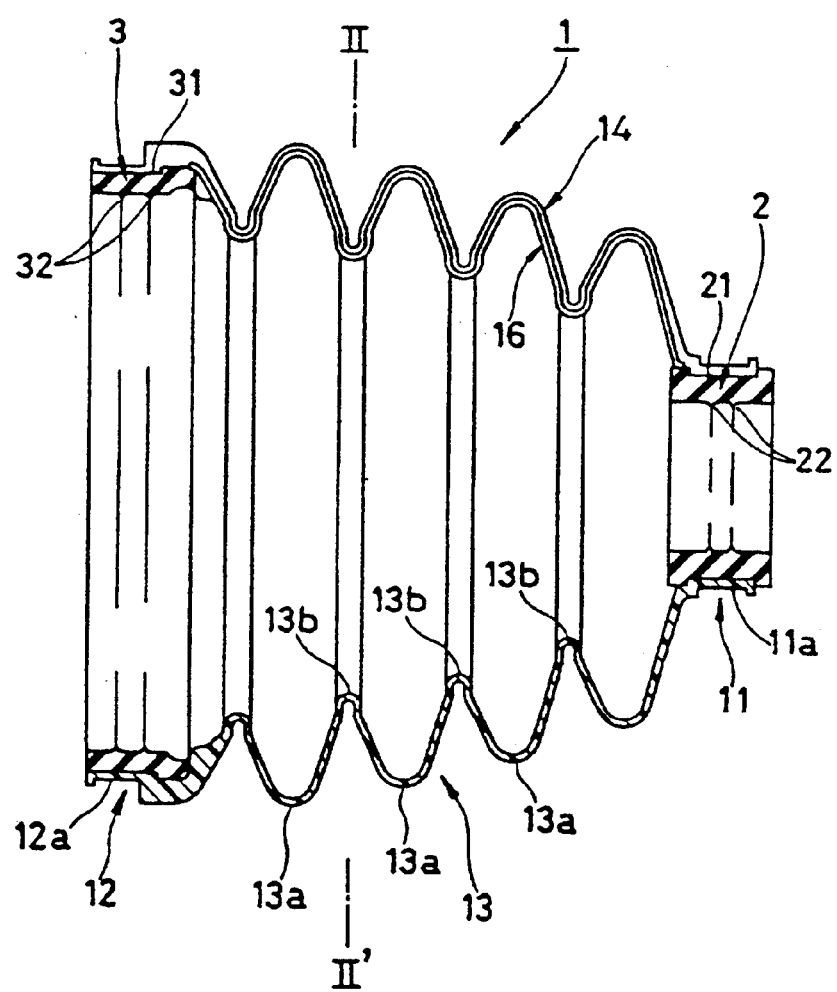

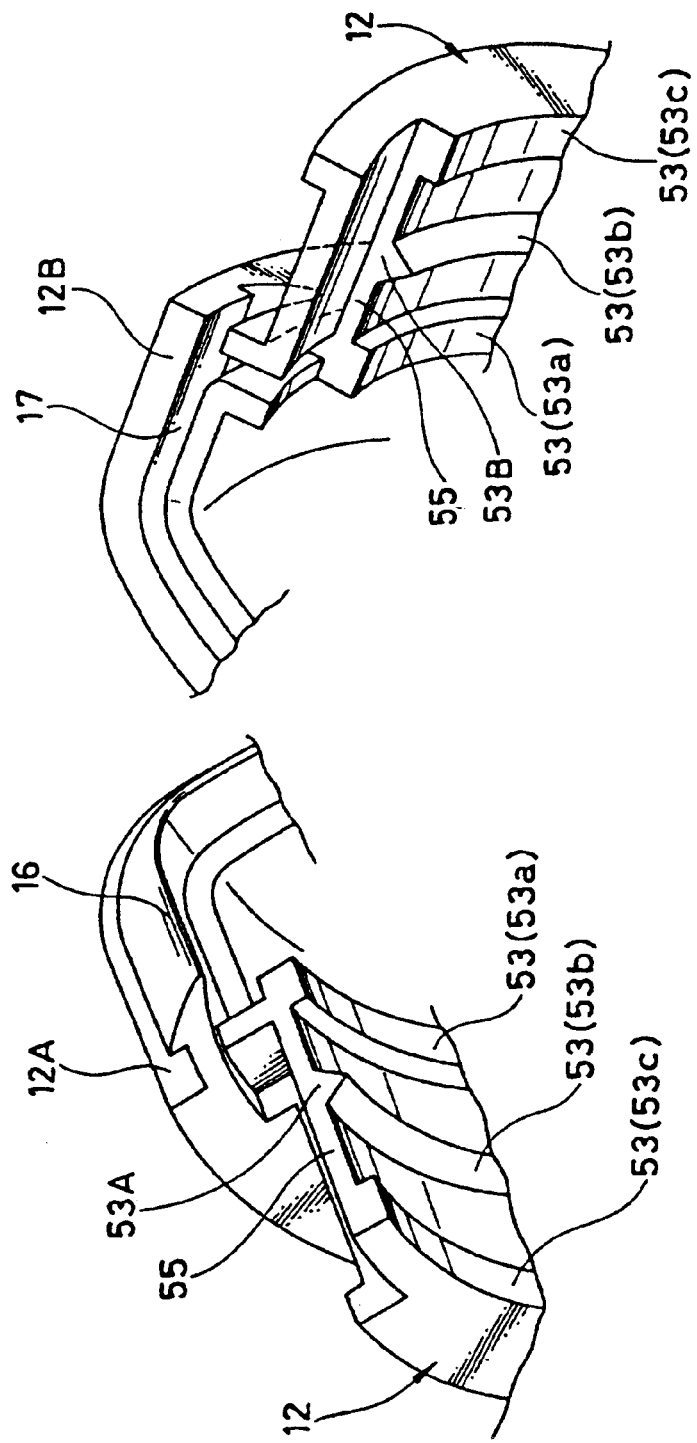

SPLIT BOOTS AND METHOD OF CONNECTING THE BOOTS, DEPOSITING AGENT, AND HEATING BODY

BACKGROUND OF THE INVENTION

1. Field of the Invention

This invention relates to a boot used for sealing, for example, the operating part of a universal joint, and a connecting method, welding agent and heating body therefor.

2. Description of the Prior Art

In this type of boots, mounting parts present on both axial ends thereof are mounted, for example, on the outer race and joint shaft of a universal joint, whereby the bellows-formed flexible part of the boot is flexibly expanded and contracted to prevent the intrusion of an external foreign matter to the operating part of the universal joint and, further, to seal the oil and fat such as grease filled in the operating part.

In a conventional split type boot, which is one type of the above-described boots, a rubber-made boot is divided in one circumferential part. A plurality of fasteners consisting of male connecting member and female connecting member arranged at prescribed intervals is integrally provided on each of the circumferentially opposed split end parts. In mounting, the boot is put over a universal joint from the side by opening the split part. The fasteners are coupled and also adhered together by an adhesive, whereby the split end parts are mutually connected in the closely fitted state.

The boot is rotated in the state where the shaft centers of the outer race and joint shaft having both the axial end mounting parts fixed thereto are mutually inclined. Accordingly, the bellows part repeats bending and stretching motions every half period of the rotation. In the split boot, the repeated bending and stretching of the mutually adhered divided end parts induce the danger of the hardened adhesive layer causing a deterioration such as crack by fatigue, resulting in the early leakage of the grease within the universal joint. Further, it is necessary to provide the male connecting member and female connecting member of the fasteners in the divided end parts with high precision. It is also necessary to ensure the sealing property of the fasteners by applying a coating agent or the like because of its low sealing property. Further, their scanty following property to the bending and stretching deformation of the boot induces the danger of its breakage within a short period.

SUMMARY OF THE INVENTION

This invention has an object to improve the sealing performance and fatigue strength in the opposed split end parts of a split type boot and also improve the working property in mounting.

A split type boot according to one embodiment of this invention is a cylindrical boot divided in one circumferential part, in which a protruding part and recessed part extending along the sectional form of the boot are formed on the circumferentially opposed split end parts to be integrally connected in mounting, respectively. The protruding part on one split end part and the recessed part on the other split end part have the forms to be hooked (engagingly locked) to each other in one thickness directional side. An overlapping protruding part is protruded longer than the protruding part on the non-hook (lock) side in the recessed part, and connected extending over the protruding part and the one split end part.

Both the axial end mounting parts of the boot are preferably formed of a rubber-like elastic material more elastic than the boot. The boot is mounted on the outside surface of a counter material through a packing divided in one circumferential part.

A split type boot according to another embodiment of this invention is provided with an open part formed by dividing one circumferential part thereof, and mounted by connecting the open part after covering a mounting member such as universal joint. The open part is connected by heating and welding it by a heating body having self-heating property.

In a connecting method for a split boot according to a further embodiment of this invention, the boot has an open part formed by dividing one circumferential part thereof, and the open part is connected after covering a mounting member such as universal joint. A heating body having self-heating property is brought into contact with or approached to the open part to heat and weld the open part by the heating body.

A welding agent according to an additional embodiment of this invention is a welding agent used in the connection of the open part formed by dividing one circumferential part after covering a mounting member such as universal joint, and it is applied to the opposed surfaces of the open part to weld the opposed surfaces together.

A preferable welding agent according to this invention consists of a solvent for dissolving a thermoplastic elastomer. The welding agent is formed of a simple body or mixture of solvents, for example, dimethylformamide, tetrahydrofuran, toluene, ethyl acetate, methyl ethyl ketone, acetone, cyclohexanone, and dichloromethane.

A heating body according to another embodiment of this invention is a heating body used in the connection of the open part formed by dividing one circumferential part, which has self-heating property, and is fixed to the boot to heat and weld the open part in contact with or adjacent to the open part.

A preferred heating body according to this invention is formed of an amorphous bag and a heating component put therein so as to be deformable following the bellows form of the boot.

Further preferably, an irregular form laid along the irregularities of the bellows is preliminarily imparted to the outer surface of the heating body so as to closely fit to the open part along the bellows form of the boot.

According to a preferred split type boot of this invention, satisfactory sealing property is ensured for the mutually connected split parts of the boot in the state mounted on a mounting member such as universal joint, because the protruding part and recessed part are continuously extended on the split end parts of the boot, and the fitting surfaces thereof are integrated together by welding, fusion or adhesion. Further, because a large connecting area can be ensured by forming, on the non-hook side of the recessed groove, the overlapping protruding part to be connected extending over the protruding part and the one split end part continued thereto.

Further, the protruding part is set to the form to be hooked (engagingly locked) with the recessed part in one thickness directional side, whereby the split end parts can be thinned, compared with the case of forming the hook part (locking part) on both thickness directional sides. Therefore, the insert resistance in the temporary connection of the split end parts can be minimized by insert-engaging the protruding part with the recessed part, and the superposing protruding portion also guides the insertion, so that the temporary connecting work can be easily performed. Further, since the increase in stress by the repeated bending and stretching deformation can be suppressed, the fatigue durability can be improved.

When both the axial end mounting parts of the boot are mounted on the outside surface of a counter member such as universal joint through packings formed of a rubber-like elastic material more elastic than the boot, the sealing property in the mounting parts can be improved.

In a preferable boot according to this invention, the boot is manufactured without mounting fasteners on the opposed surfaces of the open part, and when the boot is mounted on the circumference of a mounting member such as universal joint, a welding agent is applied to the opposed surfaces of the open part to mutually weld the opposed surfaces together. In such a welding of the open part, the open part is heated and welded by a heating body having self-heating property, whereby the welding reaction or connecting reaction is promoted. The open part connected by welding is excellent in sealing property since the opposed surfaces are integrated together. Further, it is deformable following the deformation of the bellows part. To have self-heating property means exhibiting the heating effect for itself in use and requiring no supply of external energy as electric power. To ensure the connecting property by welding, a thermoplastic elastomer is preferably used as the material of the split type boot. To sufficiently exhibit the performance as the boot, a polyurethane thermoplastic elastomer or polyester thermoplastic elastomer highly strong and excellent in durability are preferably used.

In a preferred connecting method for a boot according to this invention, the boot is manufactured without mounting fasteners on the opposed surfaces of the open part, and when this boot is mounted on the circumference of a mounting member such as universal joint, a welding agent is applied to the opposed surfaces of the open part to weld the opposed surfaces together. In such a welding of the open part, the heating body having self-heating property is brought into contact or approached, and the open part is heated and welded by this heating body, whereby the welding reaction or connecting reaction is promoted. The open part connected by welding is excellent in sealing property since the opposed surfaces are integrated together. Further, it is deformable following the deformation of the bellows part. As the heating body having self-heating performance, a one mainly composed of iron powder, water, activated charcoal and salt or of a metal oxide and water, and generating heat mainly by oxidization reaction or reduction reaction is preferably used. Further, any other materials having self-heating performance can be used.

The heating body used for the connection of the open part is preferably formed of a permeable bag of paper, nonwoven fabric or cloth and a heating component mainly composed of iron powder, water, activated charcoal and salt or of a metal oxide and water and put therein. When a shielding film-like outer packaging enclosing this heating body is opened, the moisture in the air touches the iron to cause the oxidation reaction of the iron, or the metal oxide is reacted with water to cause the reduction reaction. High heat is generated according to this, so that the open part can be heated and welded by this high heat. In order to satisfactorily transfer the heat of the heating body to the open part in spite of the presence of the irregularities (mountain/valley) by the bellows part on the outer surface of the boot, the heating body is preferably closely fitted to the overall outer surface of the open part by putting the heating component in an amorphous bag or preliminarily imparting the irregular form laid along the irregularities of the bellows to the outer surface of the heating body. According to this, the heating body is closely fitted or approached to not only the protruding part (mountain part) of the bellows but also the recessed part (valley part) thereof to raise the temperature of the recessed part substantially equally to the temperature of the protruding part. Thus, the temperature of the whole open part can be uniformly raised, and the welding time can be thus consequently shortened.

To heat the open part, a dryer for blowing hot air, for example, can be used. In this case, however, a person must perform the work with the dryer in its hand in constant attendance until the welded part is sufficiently dried. A constraining means must be separately provided so that the open part is not opened in the middle of welding to keep the open part in the closed state. Further, the blowing of hot air may possibly cause a large dispersion of temperature between the part exposed to the hot air and the part not exposed to the hot air.

Contrary to this, when the heating body is fixed to the outer surface of the open part of the boot to perform the welding, the work can be progressed without attendance of a person in drying. The open part can be kept in the closed state until the welded part is dried without separately providing the different constraining means. Further, the heating temperature can be easily made constant. An external heat energy source such as power source apparatus or heating light is dispensed with.

To fix the heating body to the outer surface of the open part of the boot, a mounting means such as adhesive sheet, adhesive tape, tying cord, stretchable cloth or hook-and-loop fastener is preferably used.

BRIEF DESCRIPTION OF THE DRAWINGS

FIG. 1 is a sectional view of a split type boot according to one preferred embodiment of this invention.

FIGS. 3A and 3B are enlarged sectional views of essential parts of the same split type boot, wherein FIG. 3A shows the non-connected state, and FIG. 3B shows the connection completed state.

FIGS. 15A and 15B are perspective views showing the connecting structure and sealing structure of the major diameter-side end part of the boot.

DETAILED DESCRIPTION OF THE INVENTION

Figure 2:
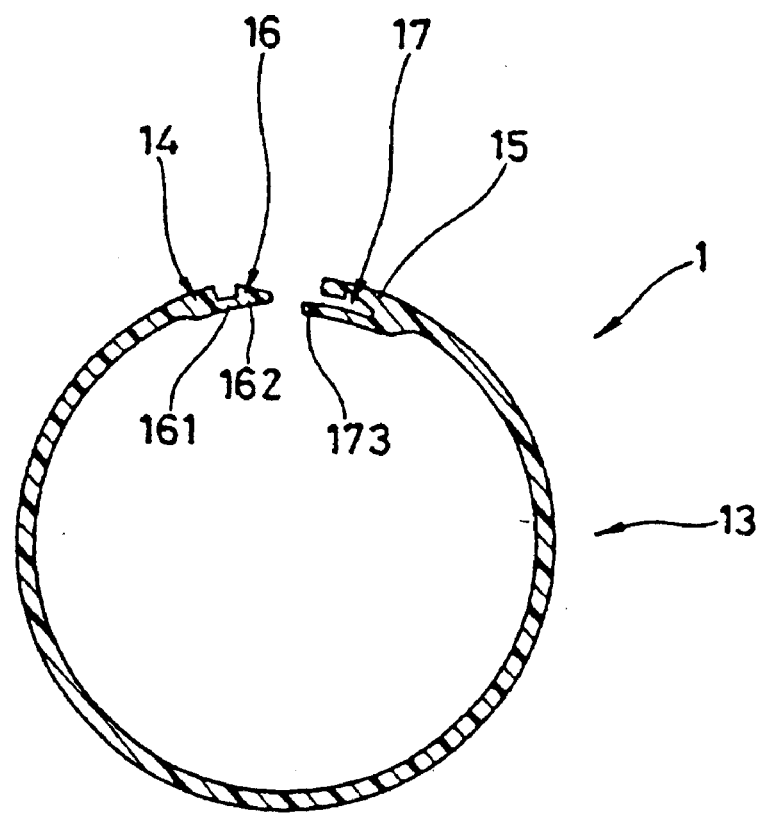
FIG. 2 is a sectional view taken along line II–II' in FIG. 1.

Embodiment of FIGS. 1–3

FIGS. 1–3 show a split type boot according to one preferred embodiment of this invention.

The outline of the split type boot is described. A protruding part 16 formed on one split end 14 of a boot 1 is temporarily connected to a recessed part 17 formed on the other split end 15 in the state where step-shaped hook portions 162a, 172a formed on one-end sides thereof are engagingly locked to each other, and then connected by welding, fusion or adhesion. The protruding part 16 is hooked only in one thickness directional end of the boot. An overlapping protruding part 173 formed on the non-hook side (inside) of the recessed part 17 is connected extending over the inside surface 16a of the protruding part 16 and the inside surface of the split end 14 continued thereto.

In FIG. 1, the whole body of the boot 1 is molded of a thermoplastic elastomer. The thermoplastic elastomer, which is abbreviated as TPE as well known, has the properties as elastomer (rubber elastic body) at ordinary temperature and shows plastic flowing property at high temperature, or the thermoplastic elastomer has a molecular structure or micro-dispersed structure in which a rubber component having entropy elasticity is coupled with a constraining component for preventing the plastic deformation at ordinary temperature. Examples of the TPE include polyurethane thermoplastic elastomer (TPU) and polyester thermoplastic elastomer (TPEE) excellent in ozone resistance, strength, cold resistance, grease resistance and fatigue resistance.

In the embodiment of FIGS. 1–3, the polyurethane thermoplastic elastomer excellent in strength, ozone resistance and fatigue resistance, compared with general rubber material, is preferably adapted as the material of the boot 1. Particularly, a polyether type polyurethane thermoplastic elastomer obtained by reacting a polyoxymethylene glycol having a number average molecular weight of 1500–2500 with a chain extender and an organic diisocyanate is preferred. A one having a melting viscosity at 200° C. of $0.5 \times 10^4$–$1.0 \times 10^6$ poise is more preferable because of excellent waterproof property and moldability. In this case, for example, the NCO index (NCO equivalent number/OH equivalent number) of the above-mentioned polyoxymethylene glycol, chain extender and organic dilsocyanate is 1.0–1.1. The chain extender consists of, for example, a low molecular weight diol having 2–10 carbon atoms, and the organic diisocyanate consists of, for example, 4,4'-diphenylmethane diisocyanate.

The boot 1 has a minor diameter mounting part 11 formed on one axial end (lateral direction of FIG. 1), a major diameter mounting part 12 formed on the other axial end, and a thin bellows part 13 formed between both the mounting parts 11, 12. The bellows part 13 is formed of repeatedly formed mountain parts 13a and valley parts 13b. Circumferentially extending band mounting grooves 11a, 12a are formed on the outside surfaces of the mounting parts 11, 12, respectively, so that bands for fastening the mounting parts 11, 12 onto the outside surfaces of the joint shaft and outer race of a universal joint, for example, can be wound on the band mounting grooves 11a, 12a, respectively.

As shown in FIG. 2, which is a sectional view taken along II–II' in FIG. 1, the boot 1 is cut or divided in one circumferential part, and has split edges or split end parts 14, 15 mutually opposed in both the circumferential sides. The split end parts 14, 15 may be called also open end parts since opened before connection. In these end parts 14, 15, the parts extending along the bellows part 13 are increased in thickness toward the inner side so as to be properly thicker than the bellows part 13.

A protruding part 16 is projectingly formed on one split end part 14 of the boot 1 in the direction opposite to the other split end part 15. A groove-like recessed part 17 corresponding to the protruding part 16 is formed on the other split end part 15. The protruding part 16 and the recessed part 17 are extended over the whole axial length of the bellows part 13 along the sectional form of the boot 1.

The protruding part 16 is formed of, as shown in FIG. 3, a neck part 161 protruded from a position closer to the inner side of the end surface 14a of the one split end part 14 in the boot 1 and a head part 162 formed at the tip of the neck part 161. The head part 162 has a step-shaped hook portion 162a standing up outward from the outer surface 161a of the neck part 161 and an outside tapered surface 162b reduced in diameter from the periphery of the step-shaped hook portion 162a toward a tip 162c. The inside surface 16a of the protruding part 16 constitutes a flat surface continued to the inside surface 14b of the one split end part 14.

The recessed part 17 has a sectional form corresponding to the protruding part 16. Namely, the recessed part 17 is formed of a neck part receiving part 171 extended from the end surface 15a turned to the one split end part 14 side in the other split end part 15 and a head part receiving part 172 extensively formed in the deep part thereof. The head part receiving part 172 has a step-shaped hook portion 172a standing up outward from the outer surface 171a of the neck receiving part 171 and an outside tapered surface 172b reduced in diameter from the periphery of the step-shaped hook portion 172a toward the inner part of the split end part 14. The inner side of the recessed part 17 forms an overlapping protruding part 173 extending longer than the protruding length of the protruding part 16 toward the one split end part 14. Its outside surface 173a is formed in conformation to the inside surface 16a of the protruding part 16 and the inside surface 14b of the one split end part 14 continued thereto.

Figure 3A:
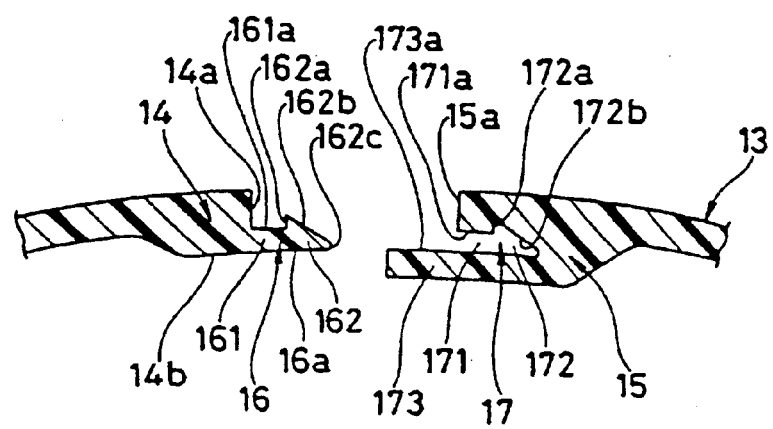
Figure 3B:
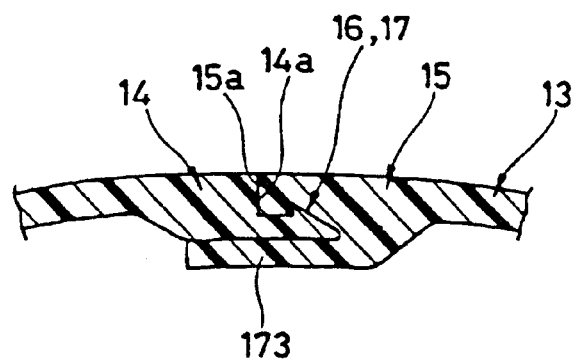

In FIGS. 3A and 3B, the lower side corresponds to the inner side of the boot.

Figure 4:
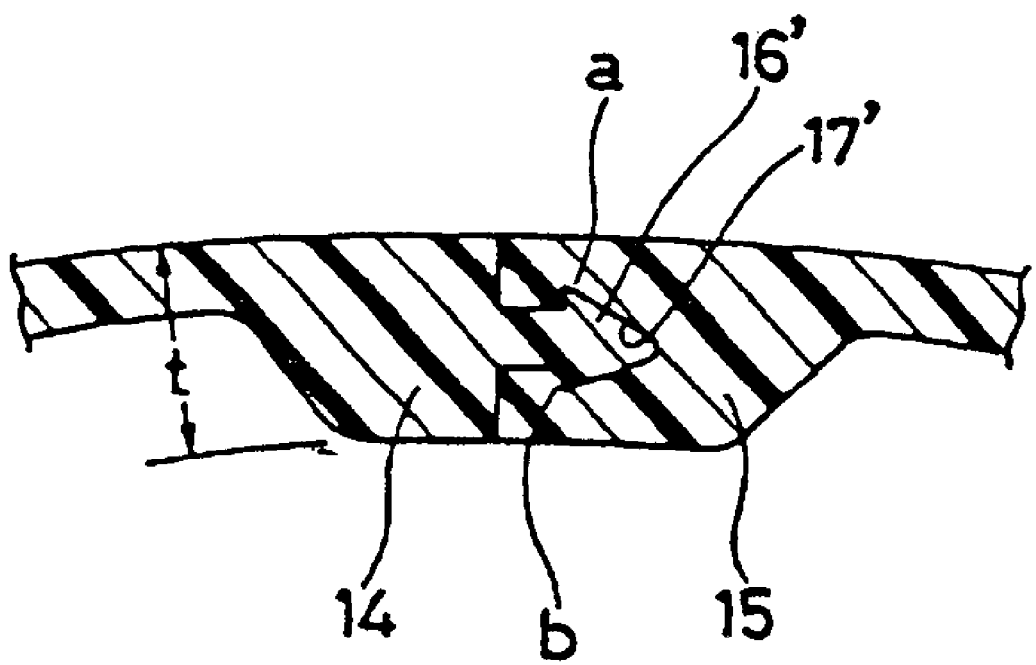
FIG. 4 is a sectional view showing a comparative example of the protruding part and recessed part formed on the split end parts (open part) of the split type boot.

FIG. 4 shows a comparative example where step-shaped hook portions a, b are formed on both the outside and inside surfaces of a protruding part 16' and a recessed part 17', respectively. Compared with this comparative example, the thickness t of the split end parts 14, 15 can be minimized in the embodiment of FIG. 3 (the protruding part 16 has the step-shaped hook portion 162a formed only on one thickness directional side (outer side) thereof, and the recessed part 17 has also the form corresponding thereto).

As shown in FIG. 1, grommets 2, 3 are arranged on the inside of both the axial end mounting parts 11, 12 of the boot 1 as packing, respectively. The grommets 2, 3 are molded of a rubber material, for example, NBR (nitrile rubber), which is more elastic than the thermoplastic elastomer forming the boot 1 and excellent in characteristics such as oil resistance, cold resistance and compression permanent distortion, and each of the grommets 2, 3 is divided in at least one circumferential part similarly to the boot 1.

The grommet 2 arranged on the inside of the mounting part 11 of the boot 1 has a strip fitting groove 11 capable of fitting with the inside part of the mounting part 11 on the outside surface and a circumferentially continued seal protruding part 22 formed on the inside surface. In the same manner, the grommet 3 arranged on the inside of the mounting part 12 of the boot 1 has a fitting stepped part 31 capable of fitting with the inside part of the mounting part 12 on the circumferential surface and a circumferentially continued seal protruding part 32 formed on the inside surface.

The above-mentioned split type boot of FIGS. 1–3 is mounted as the sealing means of, for example, a universal joint not shown, by arranging the universal joint in the inside thereof. At the time of mounting, the split end parts 14, 15 are opened and put over the universal joint from the side so that the minor diameter-side mounting part 11 and the major diameter-side mounting part 12 are situated on the joint shaft side of the universal joint and on the outer race side, respectively. Thereafter, the protruding part 16 of the one split end part 14 is inserted and fitted, as shown in FIG. 3B, to the recessed part 17 of the other split end part 15 from the separated state shown in FIG. 3A, whereby the split end parts 14, 15 are temporarily connected together.

In the above temporarily connecting process, the protruding part 16 is guided by the overlapping recessed part 173 protruded long from the inside of the recessed part 17 toward the split end part 14 side. When the head part 162 of the protruding part 16 is inserted to the neck part receiving part 171 of the recessed part 17, the recessed groove 17 is deformed so as to be open once by the interference with the outside tapered surface 162b of the head part 162. Thereafter, the head part 162 is perfectly inserted into the head receiving part 172 of the recessed part 17, whereby the protruding part 16 and the recessed part 17 are laid in the substantially closely fitted state as shown in FIG. 3B. The boot 1 consisting of thermoplastic elastomer is molded so that the split end parts 14, 15 are in opened state to some degree, as shown in FIG. 2, when no external force is added thereto. Therefore, although the both are apt to open by the elastic property possessed by the thermoplastic elastomer, the temporarily connected state can be kept since the step-shaped hook portions 162a and 172a are mutually hooked in the state shown in FIG. 3B.

The grommet 2 is arranged on the joint shaft outside surface of the universal joint so as to embrace it from the side. The minor diameter-side mounting part 11 of the boot 1 is arranged so that the inside part is fitted to the strip fitting groove 21 formed on the outside surface of the grommet 2, and fastened by a metal band wound on the band mounting groove 11a. The grommet 3 is similarly arranged on the outer race outside surface of the universal joint so as to embrace it from the side. The major diameter-side mounting part 12 of the boot 1 is arranged so that its inside part is fitted to the fitting stepped part 31 formed on the outside surface of the grommet 3, and fastened by another metal band wound on the band mounting groove 12a.

The mounting parts 11, 12 of the boot 1 consisting of thermoplastic elastomer are fixed to the joint shaft circumferential surface and outer race circumferential surface of the universal joint through the grommets 2, 3 consisting of nitrile rubber fitting well with the counter material and rich in elasticity. Particularly, the mounting parts 11, 12 are closely fitted to the grommets 2, 3 in the tongue-and-groove fitting state by the fastening force of the metallic bands from the outside. The seal surface pressure to the joint shaft outer outside surface and outer race outside surface is locally increased in the seal protruding parts 11b, 12b of the grommets 2, 3. Consequently, a satisfactory sealed state can be provided.

The split end parts 14, 15 temporarily connected by insert-engaging the protruding part 16 with the recessed part 17 is welded by use of, for example, a welding agent. The split end parts 14, 15 are connected to each other by such a method. In this case, the welding agent is preliminarily dropped and spread over the mutual connecting surfaces of the split end parts 14, 15 and the connecting surfaces among the protruding part 16, the recessed part 17 and the overlapping protruding part 173. The thermoplastic elastomer on the surface layer part of the connecting surfaces is temporarily fused, and the welding agent is then evaporated, whereby a continued thermoplastic elastomer tissue is formed to form the integrally connected state.

When the boot 1 is formed of a polyether type polyurethane thermoplastic elastomer, the welding agent used for the connection of the split end parts 14, 15 is suitably prepared by dissolving the polyurethane thermoplastic elastomer to a solvent consisting of a mixture of dimethylformamide and tetrahydrofuran (THF) to regulate the viscosity (mPa·s) to 100–10000. By such a regulation of the viscosity, the solvent is hardly sagged in the application, and the working property can be improved. As the solvent, ethyl acetate, acetone, methyl ethyl ketone (MEK), cyclohexanone, or a mixed solvent obtained by adding a small quantity of chloroform, N-methyl-2-pyrolidone or dibutyl ether to the dimethylformamide can be used.

To mutually connect the split end parts 14, 15 temporarily connected by the protruding part 16 and the recessed part 17, means such as fusion by heating or adhesion by dope cement can be adapted in addition to the above welding by the welding agent. In the connection by fusion, it is preferred to temporarily heat the fitting parts of the split end parts 14, 15 or adding a high frequency vibration thereto. Namely, the connection is performed by temporarily heating and fusing the thermoplastic elastomer in the fitting surfaces of the split end part protruding part 16 and recessed part 17 to form a continued thermoplastic elastomer tissue.

The split end parts 14, 15 of the boot 1 are integrally connected to each other by the above work. A wide connecting area can be ensured by the overlapping protruding part 173. The leakage of the grease within the universal joint through the connecting part of the split end parts 14, 15 or the intrusion of external mud water or dust through the connecting part of the split end parts 14, 15 can be effectively prevented. Although the split end parts 14, 15 are formed thick, compared with the bellows part 13, they can be thinned, compared with the one having a mushroom-shaped sectional hook structure shown in FIG. 4. Therefore, the bending and stretching deformability can be ensured in the split end parts 14, 15. The fatigue resistance in the split end parts 14, 15 can be also improved to prevent the early peeling of the connecting surfaces.

The boot 1 is molded of the thermoplastic elastomer excellent in strength, ozone resistance and fatigue resistance, compared with general rubber material and having waterproofing property. Therefore, the boot 1 hardly causes the leakage of grease by fatigue breakage in the boot 1 connecting part and exhibits excellent durability.

In the above embodiment, for example, the grommets 2, 3 as packing can be preliminarily integrated to the insides of the mounting parts 11, 12 of the boot 1 by means of fitting, or integrated to the boot 1 by adhesion.

The product endurance test and material waterproof test were performed with respect to the embodiment of FIGS. 1–3.

EXAMPLE

An organic diisocyanate corresponding to a theoretical quantity was prepared by mixing 660 parts of polyoxymethylene glycol having a number average molecular weight of 1700 with 55 parts of 1,4-butane diol as chain extender, 252.5 parts of 4,4'-diphenylmethane diisocyanate was added thereto, and the resulting mixture was reacted at 160° C. for 10 minutes. The resulting polyether type polyurethane thermoplastic elastomer was used to injection mold a split type boot of the form shown in FIGS. 1 and 2. The connection of the split end parts 14, 15 of the boot 1 was performed by welding by use of a welding agent. The welding agent used was prepared by dissolving a polyether type polyurethane thermoplastic elastomer of the same material as the member to be connected to a solvent consisting of dimethylformamide to regulate the viscosity (mPa·s) to 1000. After applying the welding agent, the boot 1 was stably held at room temperature for 15 minutes.

COMPARATIVE EXAMPLE

By use of a polyolefine thermoplastic elastomer (Santoprene 101-87: manufactured by AES), the split type boot of the form shown in FIGS. 1 and 2 was injection molded. The connection of the split end parts 14, 15 of the boot 1 was performed by welding by use of a welding agent. As the welding agent, dimethylformamide was used, and after applying the welding agent, the boot was stably held at room temperature for 15 minutes.

The evaluation (product endurance test) was performed as follows.

Each of the thus-manufactured boots of the example of this invention and its comparative example was mounted on an oscillating rotary testing device to measure the endurance. The endurance was judged according to the time when the grease is leaked from the boot after starting the operation.

Test Condition

| | |
|---|---|
| Temperature: | Room temperature |
| Oscillating angle: | 25–40° |
| Oscillating cycle: | 30 times/min |
| Rotational Frequency: | 600 rpm |

The test result was as follows.

In the product endurance test, the grease leakage was confirmed at 20 minutes after starting the test in the comparative example. Contrary to this, it took 280 minutes for the occurrence of grease leakage in the example of this invention, from which it was thus confirmed that the split type boot molded of the polyether type polyurethane thermoplastic elastomer was more excellent in durability.

When a polyester type polyurethane thermoplastic elastomer was adapted as the material of the boot 1, also, the same effect described above can be provided. Although the form of hooking the protruding part 16 with the recessed part 17 on the outer side is adapted in the embodiment of FIGS. 1–3, the form of hooking the protruding part 16 with the recessed groove 17 on the inner side and providing the overlapping protruding part 173 on the outer side of the recessed groove 17 can be also adapted.

Embodiment of FIGS. 5–12

Figure 5:
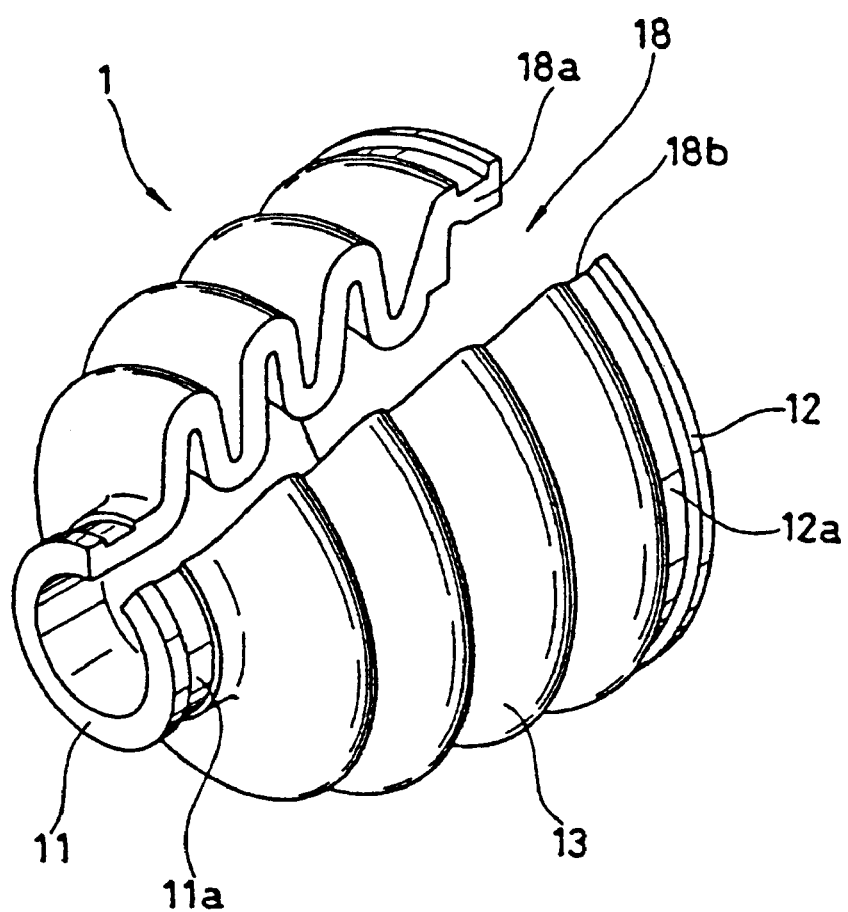
FIG. 5 is a perspective view of a split type boot according to another embodiment of this invention.

A split type boot 1 according to the embodiment of FIG. 5 is cylindrical as the whole, and provided with an annular minor diameter-side mounting part (also referred to as fixing part) 11 on one end open part. The boot 1 has an annular major diameter-side mounting part 12 having a diameter larger than the minor diameter-side mounting part 11 on the other end open part. Further, a bellows part 13 is integrally molded between both the mounting parts 11, 12. The whole boot 1 is molded of a thermoplastic elastomer. The thermoplastic elastomer is a polyurethane thermoplastic elastomer.

The boot 1 has an open part (also referred to as split member, connecting part or cut part) 18 formed by dividing and opening one circumferential part over the whole length. The open part 18 is connected by heating and welding it by a heating body having self-heating property (referred also to as heating agent, heating element, or heat generating agent).

The boot 1 is manufactured without forming fastener parts on the opposed surfaces 18*a*, 18*b* of the open part 18, and mounted on the circumference of a universal joint by opening the open part 18 to put the boot 1 over the universal joint through the open part 18, and connecting the open part 18. At this time, the minor diameter-side mounting part 11 is fixed to the drive shaft side by a band, and the major diameter-side mounting part 12 is similarly fixed to the universal joint side by another band.

Heating Body

A heating body 41 comprises a permeable bag 42 consisting of paper, nonwoven fabric or cloth and a heating component (not shown) mainly composed of iron powder, water, activated charcoal and salt, or of a metal oxide and water put in the bag 42. When an outer packaging (not shown) consisting of a shielding film is opened in use, the moisture in the air touches the iron component to cause the oxidation reaction of this iron component, or the metal oxide and water cause a reduction reaction. According to this, high heat is generated. The open part 18 can be heated and welded by this high heat. The bag 42 containing the heating component has freely deformable amorphous property. One surface of the bag 42 forms an adhesive surface 43 by sticking an adhesive sheet so that the heating element 41 can be fixed to the outer surface of the open part 18 of the boot 1. A heating surface 44 for generating high heat is set on the same plane.

Although a chemical reaction type heating material is used for the above heating, a phase change type heat reserving material generating heat in the crystallization of a crystalline material from the supercooled state can be also used. Examples of the heat reserving material include sodium acetate hydrate and the like. Since this material is liquefied in contrast to the former powdery material, it is further fitted well to the form of the boot.

Figure 7:
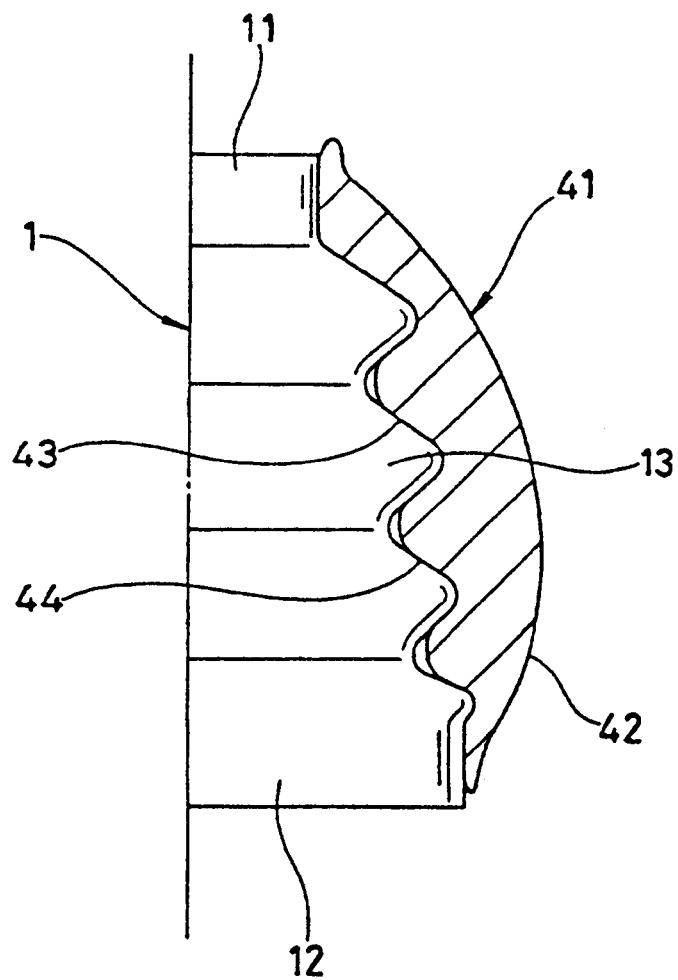
FIG. 7 is a sectional view of the split type boot in the state where the heating body is fixed thereto.
Figure 8:
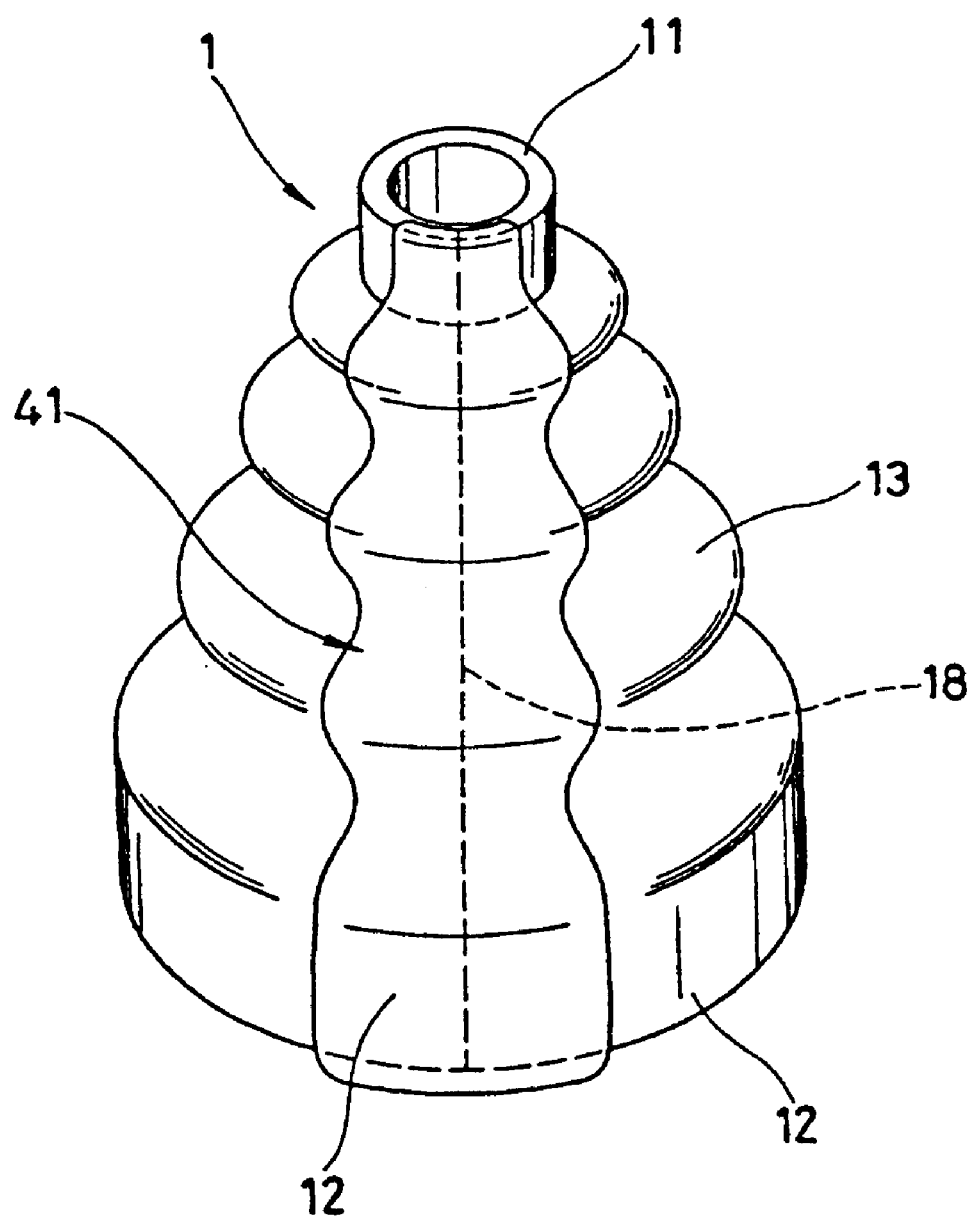
FIG. 8 is a perspective view of the split type boot in the state where the heating body is fixed thereto.

As shown in FIGS. 7 and 8, the heating body 41 is stuck extending over the outer surface of the open part 18 of the boot 1. This adhesive force retains the open part 18 in the closed state so as not to be open during the welding work. The bag 42 is properly deformed along the irregularities (mountain/valley) of the outer surface of the bellows part 4 of the boot 1 and closely fitted to the irregularities in a wide area. Therefore, the heat generated in the heating body 41 is efficiently transferred to the open part 18. The open part 18 can be efficiently heated and welded by this efficiently transferred high heat.

Figure 9A:
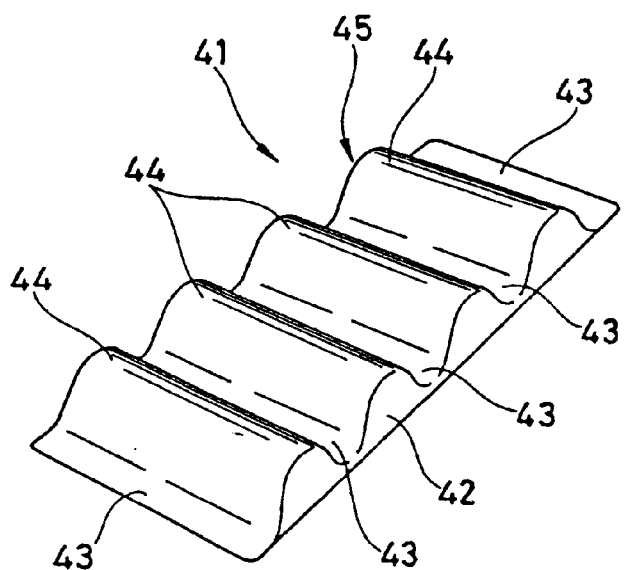
FIG. 9A is a perspective view showing another example of the heating body.
Figure 10:
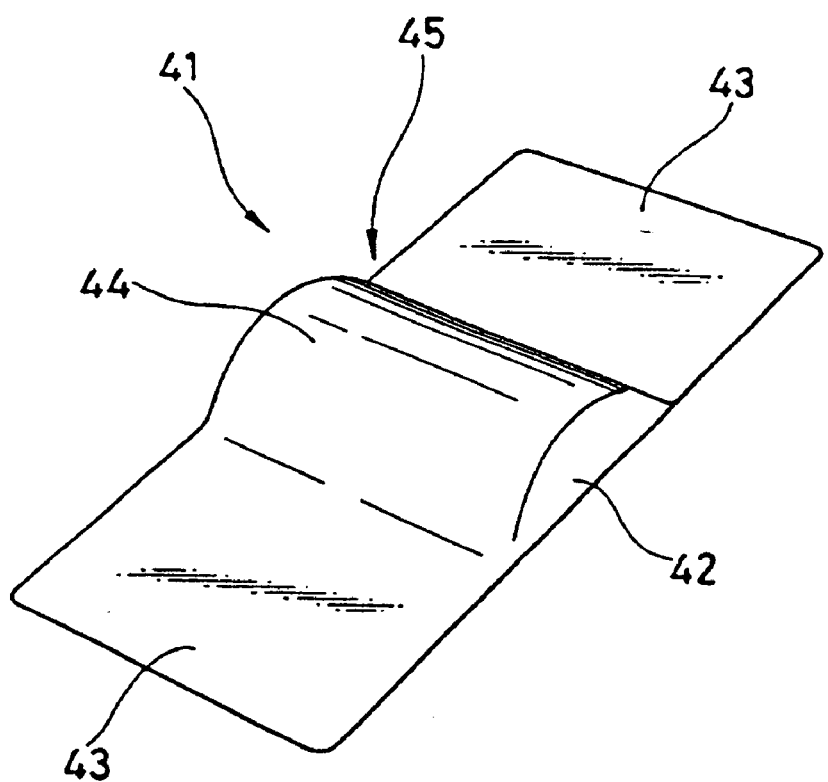
FIG. 10 is a perspective view showing another example of the heating body.

As shown in FIGS. 9A and 10, an irregular form 45 is preliminarily formed on the outer surface of the heating body 41, and arranged according to the irregularities of the outer surface of the bellows part 4. According to such a method, also, the heating surface 44 of the heating element 41 can be brought into contact with the boot 1 in a wide area. The heating body 41 of FIG. 9A has a plurality of irregularities. The heating element 41 of FIG. 10 has one protruding part.

Figure 9B:
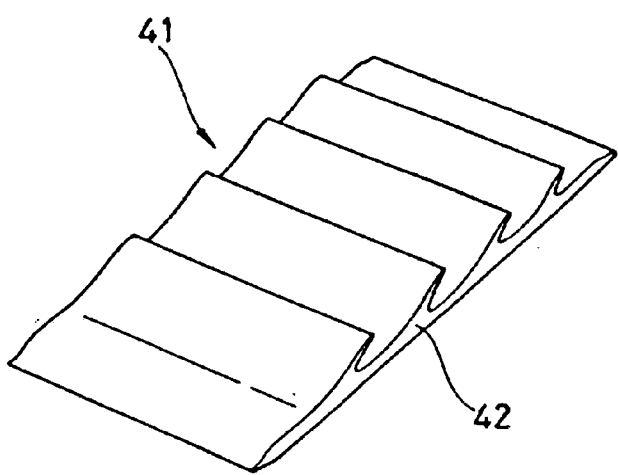
FIG. 9B is a perspective view of the heating body in the folded state.

In the storage of the heating body 41, the outer surface is folded in an irregular form as shown in FIG. 9B. Therefore, the outer surface is preferably covered with a packaging consisting of a stretchable material, for example, nylon tights, nylon stockings or the like so that the moisture in the air can be shielded.

As the mounting means for fixing the heating body 41 to the outer surface of the boot 1, various fixing means are adaptable in addition to the above adhesive sheet.

Figure 11:
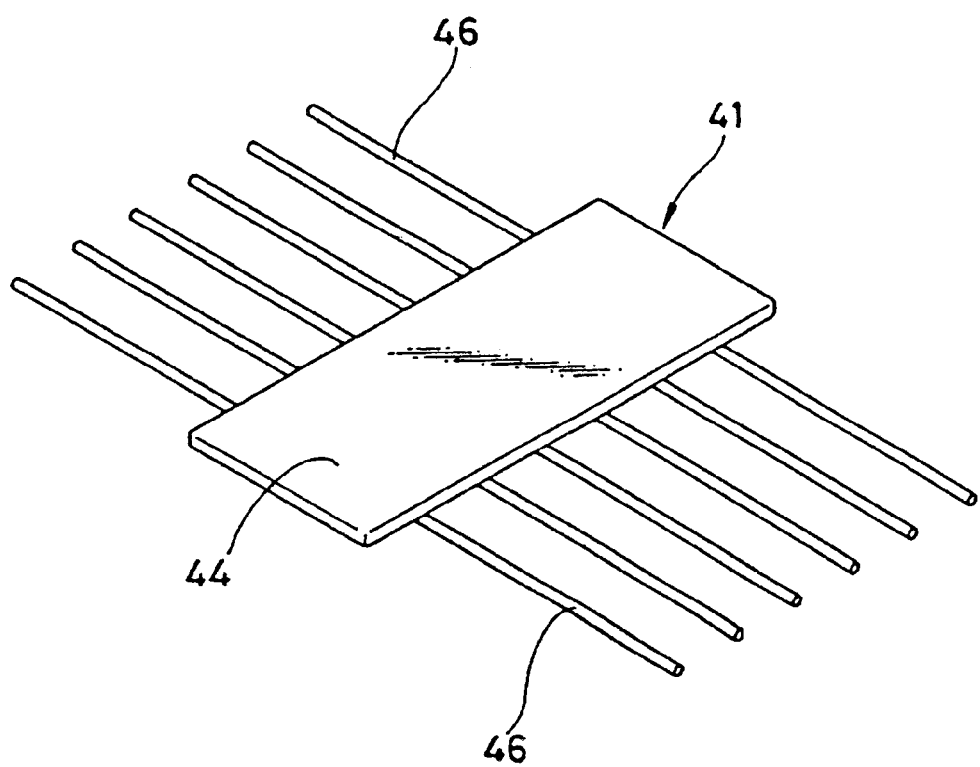
FIG. 11 is a perspective view showing a further example of the heating body.
Figure 12:
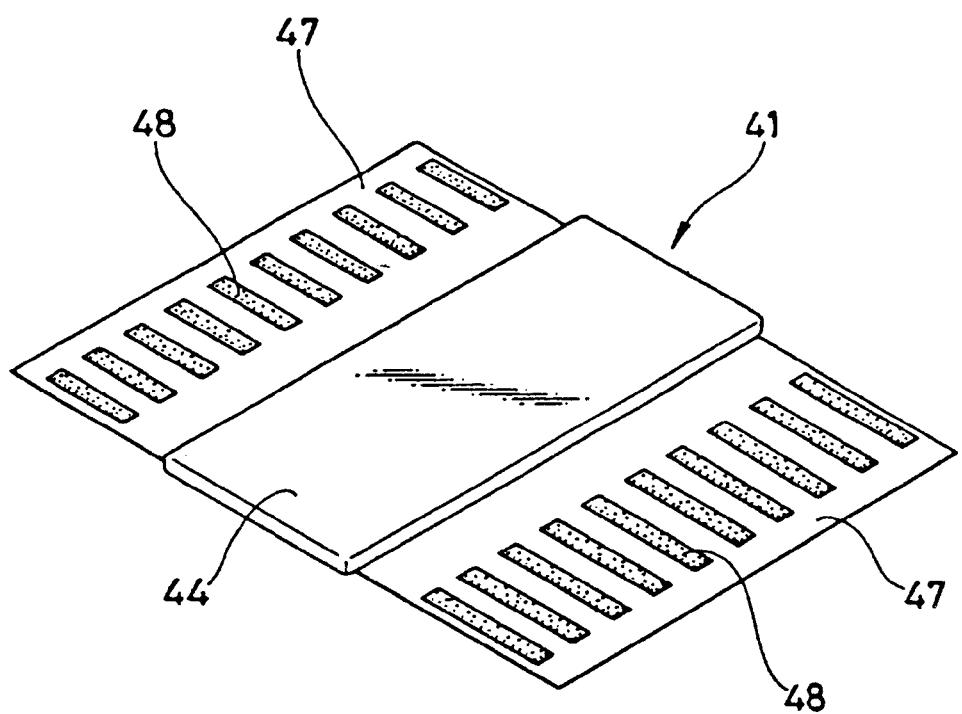
FIG. 12 is a perspective view showing an additional example of the heating body.

FIGS. 11 and 12 show examples of the fixing means. In the example of FIG. 11, a plurality of tying cords 46 are mounted on both sides of the heating body 41 as a commercially available body warmer. The tying cords 46 are laid around the boot 1, and the tips thereof are tied together.

In the example of FIG. 12, a pair of stretchable cloths 47 is mounted on both sides of the heating body 41 as a commercially available body warmer. A plurality of hook-and-loop fasteners 48 is mounted on the stretchable cloths 47. The stretchable cloths 47 are laid around the boot 1, and the hook-and-loop fasteners 48 are superposed and closed together.

In both the cases, the open part 18 can be kept in the closed state since the boot 1 is circumferentially constrained by the tying cords 46 or stretchable cloths 47. Further, the heating surface 44 of the heating body 41 can be closely fitted to the outer surface of the open part 18 since the heating body 41 is deformed along the irregularities of the outer surface of the bellows part 4.

Such a cloth mounting means has heat retaining effect since it is flat to cover the circumference of the boot 1, whereby the effect of uniforming the temperature of the weld part to promote the welding can be provided.

In the mounting of the boot 1 on the circumference of a mounting member such as universal joint, the universal joint is covered with the boot 1, the welding agent is applied to the opposed surfaces 18a, 18b of the open part 18, and the opposed surfaces 18a, 18b are closed together to block the open part 18. The closed state of the open part 18 is kept by use of various mounting means described above. The heating body 41 is also closely fitted to the outer surface of the open par 18 and heated. After the lapse of a prescribed time, the heating body 41 is removed from the boot 1. Then, the open part 18 is stimulated by the heating effect of the heating body 41, and heated and welded in a relatively short time, whereby the mounting work is completed.

According to this method, the complicated work of precisely mounting fasteners on the opposed surfaces 18a, 18b of the open part 18 in the manufacture of the boot 1 can be omitted, and the manufacture of the boot 1 can be thus facilitated.

For the mounting of the boot 1, the mounting of the heating body 41 on the outer surface of the open part 18 followed by heating is sufficient. Therefore, the person in charge can leave the working site during the welding work.

The connecting work of the open part 18 of the boot 1 or the mounting work of the boot 1 can be thus facilitated.

The welded open part 18 is excellent in sealing property because the opposed surfaces 18a, 18b are integrated together by welding. The work of separately applying a coating agent or sealant to the opposed surfaces 18a, 18b can be omitted. The connecting work of the open part 18 or the mounting work of the boot 1 can be thus facilitated also from this point.

Since the welded open part 18 is freely deformed according to the deformation of the bellows part 4, the boot 1 is also excellent in deformation following property of the open part 18. Accordingly, the open part 18 can be prevented from being broken in a short period to improve the durability.

Performance comparative tests were performed with respect to the welding structure according to the embodiment of FIG. 5. The content and result are described below.

The first performance test is the peel test of the connected open part 18. The connected open part 18 was peeled with the hands, and the state at that time was evaluated as follows.

○: Not peeled.

Δ: 50% of the open part was peeled.

X: All the open part was peeled.

The second performance test is the evaluation of the operating state of the connected open part 18. After the boot 1 was integrated into a joint after connection and rotated 10 times at a maximum angle of 40°, the state of the open part 18 was evaluated as follows.

◎: Not opened.

○: One extremely small (2 mm or more) opening is present.

Δ: Several extremely small (2 mm or more) openings are present.

X: Several openings (more than 2 mm) are present.

Example 1

Figure 6:
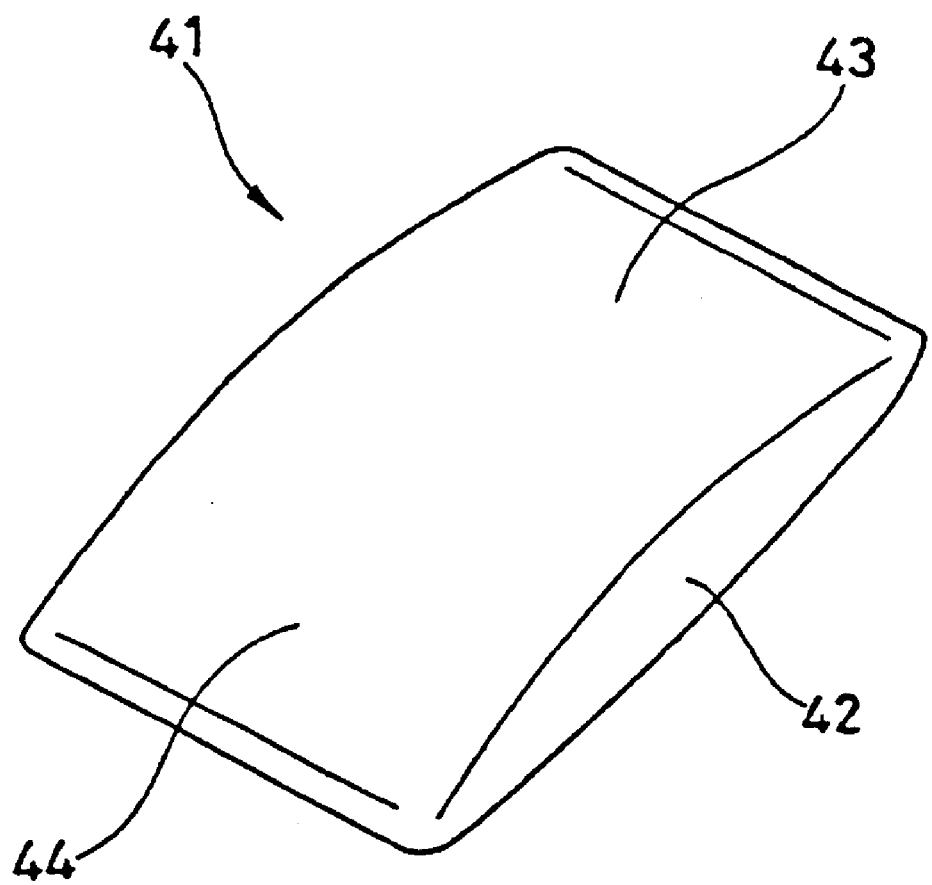
FIG. 6 is a perspective view showing one example of a heating body for manufacturing the split type boot according to this invention.

After the open part 18 of a split type boot 1 consisting of polyurethane thermoplastic elastomer material was welded, a heating body 41 shown in FIG. 6 was touched to the open part 18 and held for 10 minutes.

Example 2

After the open part 18 of a split type boot 1 consisting of polyurethane thermoplastic elastomer material was welded, a heating body 41 shown in FIG. 9 was touched to the open part 18 and held for 10 minutes.

Example 3

After the open part 18 of a split type boot 1 consisting of polyurethane thermoplastic elastomer material was welded, a heating body 41 shown in FIG. 10 was touched to the open part 18 and held for 10 minutes.

Example 4

After the open part 18 of a split type boot 1 consisting of polyester thermoplastic elastomer material was welded, a heating body 41 shown in FIG. 6 was touched to the open part 18 and held for 10 minutes.

Comparative Example 1

After the open part 18 of a split type boot 1 consisting of polyurethane thermoplastic elastomer material was welded, the open part 18 was held for 10 minutes without applying the heating body 41 thereto.

Comparative Example 2

After the open part 18 of a split type boot 1 consisting of bolyurethane thermoplastic elastomer material was welded, the open part 18 was held for 30 minutes without applying the heating body 41 thereto.

Comparative Example 3

After the open part 18 of a split type boot 1 consisting of polyurethane thermoplastic elastomer material was welded, the open part 18 was heated for 10 minutes by use of a drier without applying the heating body 41 thereto.

The test results are shown in Table 1, from which the effectiveness of this invention could be confirmed.

Welding Agent

A preferred embodiment of a welding agent proposed by this invention is as follows.

When the open part 18 of a split type boot 1 consisting of thermoplastic elastomer is connected not by welding with a welding agent but by adhesion or heating fusion, problems as described below might arise.

In the adhesion of the open part 18 by an adhesive, the open part 18 might be peeled since the adhesive can adhere the open part 18 but not follow the movement of the boot 1.

Contrary to this, in the welding of the open part 18 by use of the welding agent as in this invention, the connected part can follow the movement of the boot 1 since the connecting part is integrated to the boot body.

The adhesion by use of the adhesive is not suitable for the actual assembling work (the adhering work is desirably completed within 30 minutes) in a repair shop. Namely, the effectiveness is lost before the completion of the adhering work in case of an instantaneous adhesive type, so that the open part 18 cannot be adhered. A general adhesive (hardenable type) requires about one night for the completion of the adhering work, and thus is not suitable for the work.

When the open part 18 is welded by use of the welding agent as in this invention, the assembling work can be completed within 30 minutes by regulating the kind of solvent and the mixing ratio. A preferred welding agent proposed by this invention consists of a single body or mixture of solvents such as dimethylformamide, tetrahydrofuran, toluene, ethyl acetate, methyl ethyl ketone, acetone, cyclohexanone, dichloromethane, N-methyl-2-pyrolidone and dibutyl ether, to which a thermoplastic elastomer is further dissolved therein to raise the viscosity of the solution. Further, the welding agent consists of a one obtained by dissolving a thermoplastic elastomer to a mixed solution of dimethylformamide and tetrahydrofuran to regulate the viscosity to 10–10000 mPa·s, and further a mixed solution of dimethylformamide and tetrahydrofuran with a dimethylformamide/tetrahydrofuran mixing ratio of 10/90–90/10, to which a thermoplastic elastomer is further dissolved to regulate the viscosity to 10–10000 mPa·s. The working time can be freely controlled so as to be suitable for the actual work by combining these components. The thermal fusion of the open part 18 has an unpreferable side as the actual work in a repair shop because of the necessity of a fusing device (for example, solder lever, dryer, special apparatus or the like). Contrary to this, the welding of the open part 18 by use of the welding agent as in this invention can dispense with such a device or power source.

With respect to the welding agent proposed by this invention, performance comparative tests were performed. The content and result are described below.

The first performance test was the peel test of the connected open part 18. The connected open part 18 was peeled with the hands, and the state at that time was evaluated as follows.

○: Not separated.

Δ: 50% of the open part was separated.

X: All the open part was separated.

The second performance test is the evaluation of the operating state of the connected open part 18. After the boot 1 was integrated into a joint after connection and rotated 10 times at a maximum angle of 40°, the state of the open part 18 was evaluated as follows.

◎: Not opened.

○: One extremely small (2 mm or less) opening is present.

Δ: Several extremely small (2 mm or less) openings are present.

X: Several openings (more than 2 mm) are present.

The third performance test is the evaluation of the easiness of application work. Each welding agent was applied to the opposed surface 18a, 18b of the open part 18, and the easiness of application quantity control at that time was evaluated as follows.

○: Extremely good

Δ: Slightly difficult to control, but there is no problem in work.

X: The viscosity is too high or too low to control.

Example 1

The open part 18 of a split type boot 1 consisting of polyurethane thermoplastic elastomer material was connected by use of a mixed solution of dimethylformamide and tetrahydrofuran with a mixing ratio of dimethylformamide/tetrahydrofuran=10/90 as the welding agent, and held for 20 minutes.

Example 2

The open part 18 of a split type boot 1 consisting of polyurethane thermoplastic elastomer material was connected by use of a mixed solution of dimethylformamide and tetrahydrofuran with a mixing ratio of dimethylformamide/tetrahydrofuran=50/50 as the welding agent, and held for 20 minutes.

Example 3

The open part 18 of a split type boot 1 consisting of polyurethane thermoplastic elastomer material was connected by use of a mixed solution of dimethylformamide and tetrahydrofuran with a mixing ratio of dimethylformamide/tetrahydrofuran=90/10 as the welding agent, and held for 20 minutes.

Example 4

The open part 18 of a split type boot 1 consisting of polyurethane thermoplastic elastomer material was connected by use of, as the welding agent, a mixed solution of dimethylformamide and tetrahydrofuran with a mixing ratio of dimethylformamide/tetrahydrofuran=50/50, to which the polyurethane thermoplastic elastomer material was further mixed to regulate the viscosity to 500 mPa·s, and held for 20 minutes.

Example 5

The open part 18 of a split type boot 1 consisting of polyester thermoplastic elastomer material was connected by use of, as the welding agent, a mixed solution of dimethylformamide and tetrahydrofuran with a mixing ratio of dimethylformamide/tetrahydrofuran=50/50, to which the polyester thermoplastic elastomer material was further mixed to regulate the viscosity to 500 mPa·s, and held for 20 minutes.

Comparative Example 1

The open part 18 of a split type boot 1 consisting of polyurethane thermoplastic elastomer material was connected by use of methanol alone as the welding agent, and held for 20 minutes.

Comparative Example 2

The open part 18 of a split type boot 1 consisting of polyurethane thermoplastic elastomer material by use of dimethylformamide alone as the welding agent, and held for 20 minutes.

Comparative Example 3

The open part 18 of a split type boot 1 consisting of polyurethane thermoplastic elastomer material was connected by use of tetrahydrofuran alone as the welding agent, and held for 20 minutes.

Comparative Example 4

The open part 18 of a split boot 1 consisting of polyurethane thermoplastic elastomer material was connected by use of, as the welding agent, a mixed solution of dimethylformamide and tetrahydrofuran with a mixing ratio of dimethylformamide/tetrahydrofuran=50/50, to which the polyurethane thermoplastic elastomer material was further mixed to regulate the viscosity to 20000 mPa·s, and held for 20 minutes.

The test results are shown in Table 2. According to this, the effectiveness of this invention could be confirmed.

In the connection of the open part 18 of the split type boot 1 according to the connecting method of this invention, the open curl of the open part 18 is corrected prior to this so that the force of mutually separating both the opposed surfaces 18a, 18b does not act on the open part 18, and the welding is then performed, whereby the work can be easily and effectively performed.

The correction of the open curl of the open part 18 can be performed according to the following method.

The boot 1 is circumferentially pressed by a fastening means such as rubber band, winding cord or winding cloth after molding, and put in a thermostat (90° C. for 1 hr in case of urethane). Otherwise, the boot 1 is circumferentially pressed by a fastening means such as rubber band just after molding, and deformed by preheat (remaining heat) (at room temperature for 5 hr). Otherwise, the boot 1 is circumferentially pressed by a fastening means such as rubber band after molding, and the opposite side to the opening is locally heated and deformed.

Embodiment of FIGS. 13–16

In a split type boot 1 according to the embodiment of FIGS. 1–3, packings consisting of grommets 2, 3 of NBR are arranged on the inner side of the minor diameter-side mounting part 11 and major diameter-side mounting part 12, respectively, to seal each mounting part 11, 12 to the shaft or outer race of a universal joint by the packing. In either one or both of the minor diameter-side mounting part 11 and major diameter-side mounting part 12, a required number of lip parts may be integrally formed on the inside surfaces of the mounting parts 11, 12 instead of the packings or in combination therewith so as to ensure the necessary sealing effect by the lip parts. This example is described below.

Figure 13:
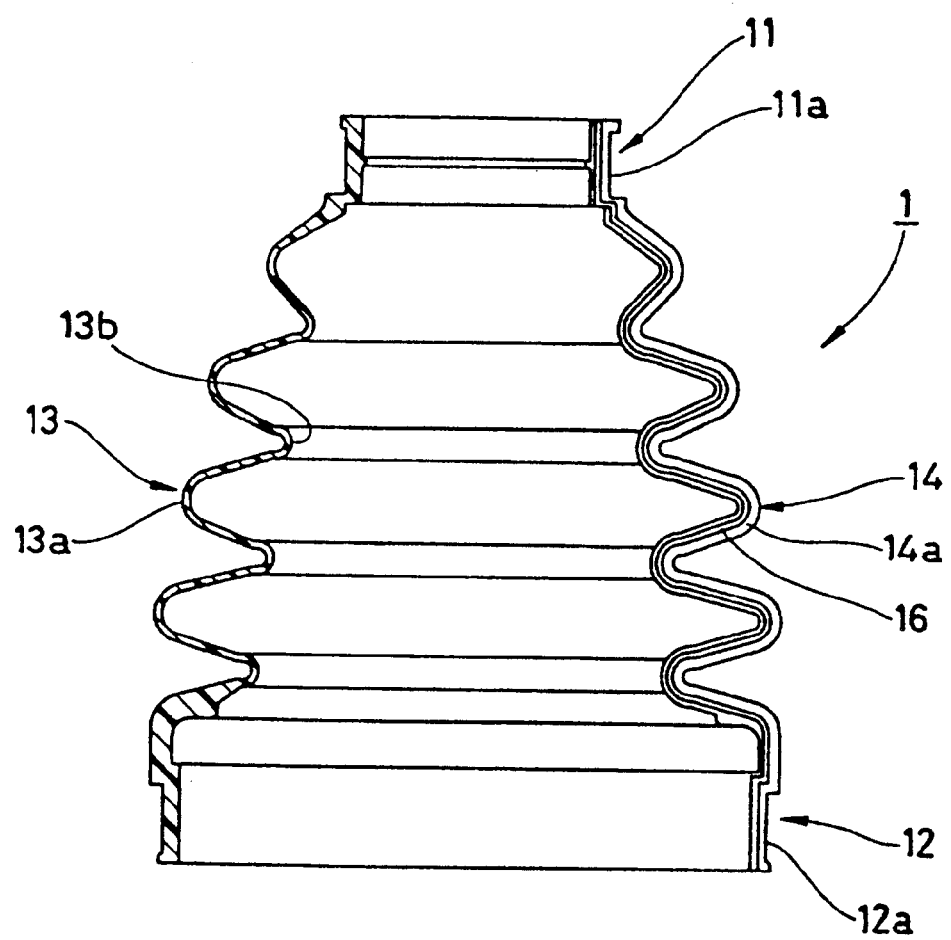
FIG. 13 is a sectional view of a split type boot according to a further embodiment of this invention.
Figure 14:
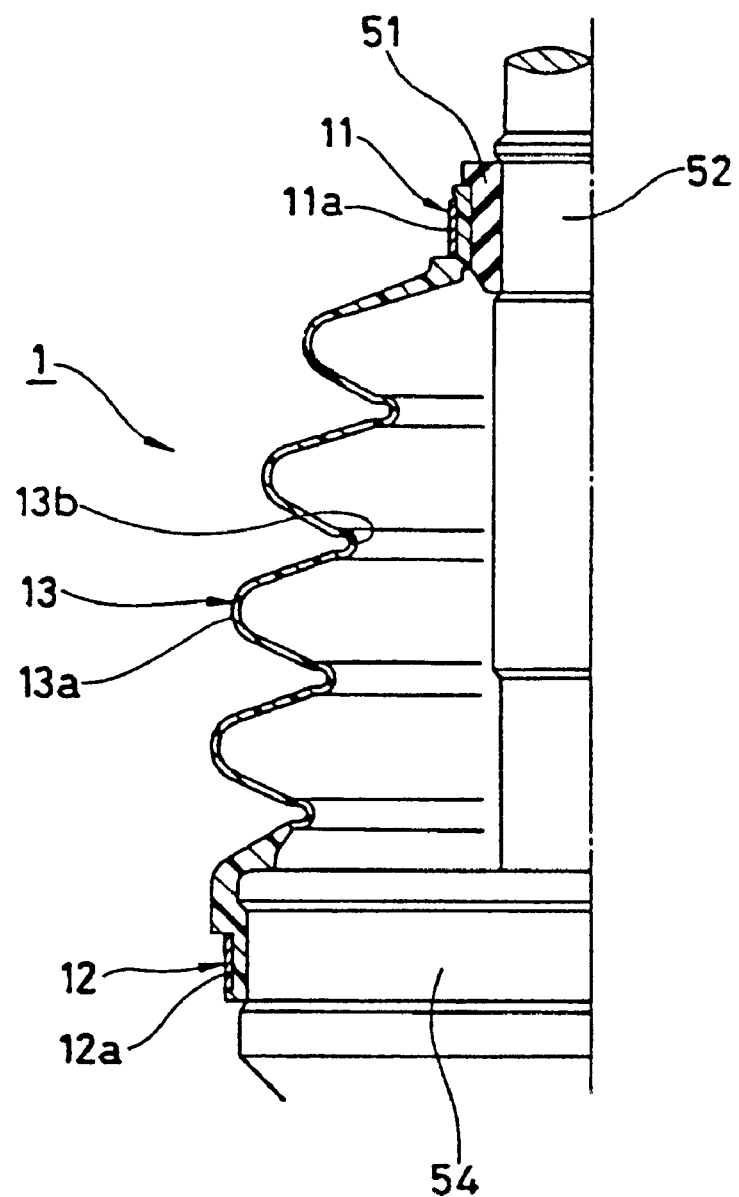
FIG. 14 is a sectional view showing the mounted state of the boot of FIG. 13.

In a split type boot 1 shown FIGS. 13 and 14, the sealing property with a shaft 52 is ensured for the minor diameter-side mounting part 11 by a packing 51 consisting of a NBR grommet. A required number of annular lip parts 53 are integrally molded on the inner side of the mounting part 12 as shown in FIG. 15 without providing any packing on the major diameter-side part 12, and the lip parts 53 are closely fitted to the outside surface of an outer race 54, whereby the necessary sealing property is ensured.

In FIG. 15, three lip parts 53 are axially arranged at prescribed intervals. The lip parts 53a, 53c on both the axial end sides are molded so as to have rectangular sections, and the axial center lip 53b is molded so as to have a triangular section.

Since the boot 1 is provided with the open part opened in one circumferential part thereof, the mounting part 12 is also divided in one circumferential part. According to this, each lip part 53 and a connecting base part 55 thereof are also divided in one circumferential part. With respect to this split structure, when the split end surfaces (referred also as to opposed surfaces) 12A, 12B of the mounting part 12 and the split end surfaces 53A, 53B of each lip 53 and the connecting base part 55 are arranged so as to be circumferentially displaced each other in step-shape, the connecting area of the whole mounting part 12 including each lip 53 and the base part 55 is increased. Therefore, the connecting force can be enhanced.

When the connecting force is insufficient, the grease within the boot 1 is frequently penetrated between the lip parts 53b, 53c. The grease is moved along the circumference between the lip parts 53b, 53c. This might result in twisting of the boot 1. To solve this, it is effective to increase the connecting area more in the following manner.

Figure 16A:
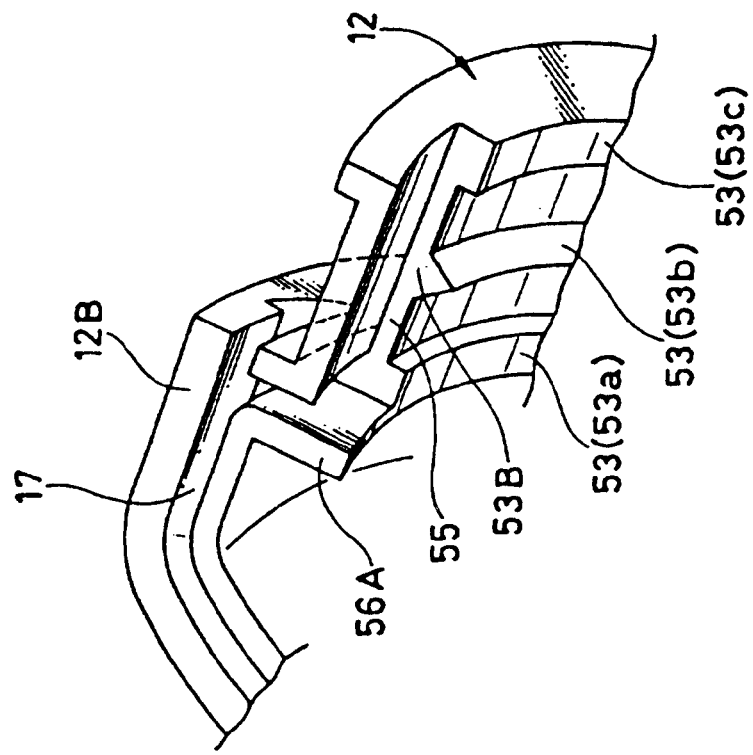
FIGS. 16A and 16B are perspective views showing another connecting structure and sealing structure of the major diameter-side end part of the boot.
Figure 16B:
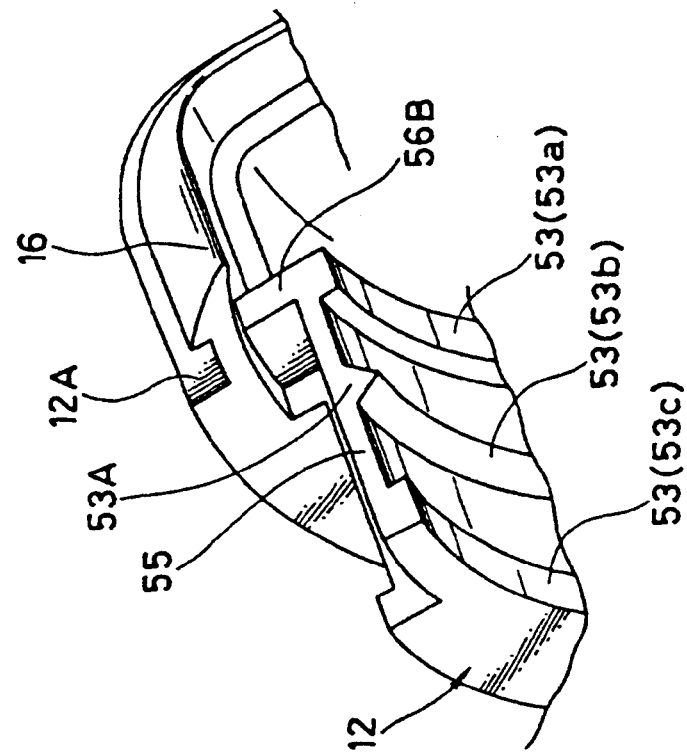
Figure 17:
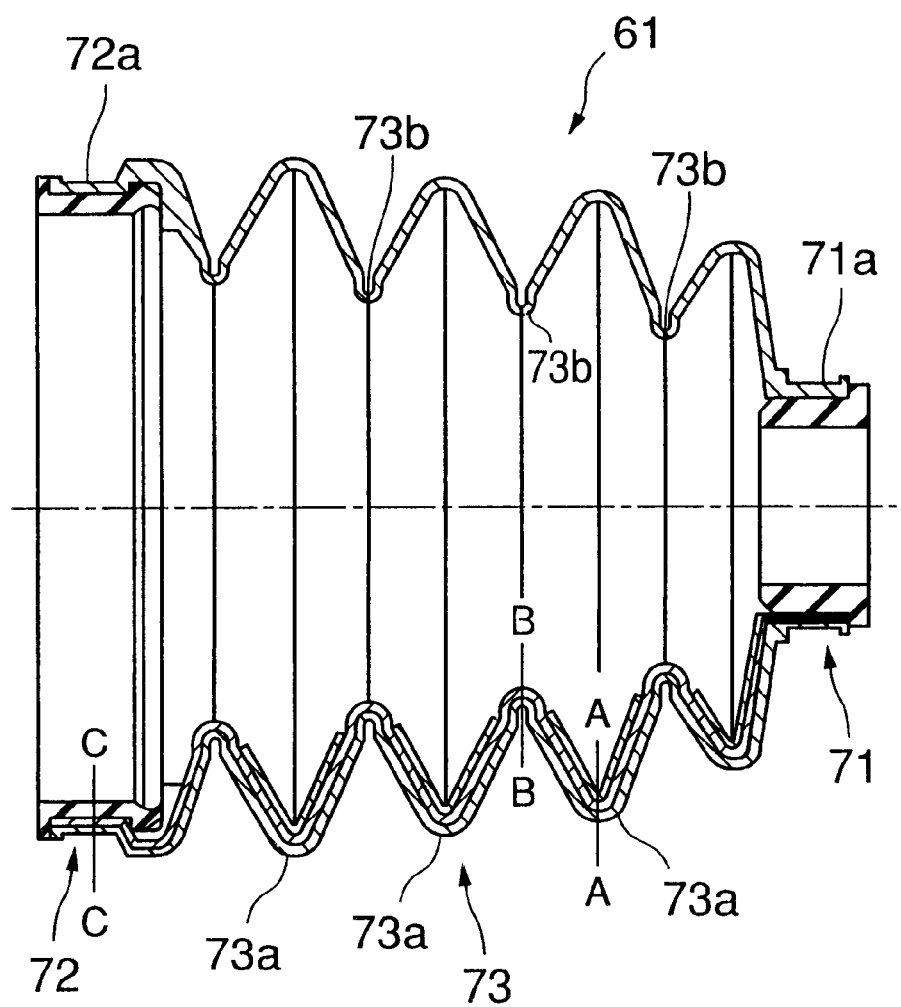
FIG. 17 is a sectional view of a split type boot according to another embodiment of this invention.

Namely, a projection-like or end wall-like stepped part 56A extending in the radial direction of the boot 1 is integrally molded on one split end surface 12B of the mounting part 12, as shown in FIG. 16, a receiver side cutout-like or end surface-like stepped part 56B to which the projection-like or end wall-like stepped part 56A is axially alternately inserted and axially closely fitted is provided on the other split end surface 12A, and both the stepped parts 56A, 56B are mutually butted and connected in the axial end surfaces when the split end surfaces 12A, 12B, 53A, 53B are mutually connected, whereby the connecting area rate is increased, compared with the case of FIG. 17. According to this, since the connecting force is enhanced more by the further increase in connecting area, the boot 1 can be prevented from being twisted even if a twisting load acts on the boot 1. Each of the stepped parts 56A, 56B has an inside diameter dimension equal to the inside diameter dimension of the lip part 53 (53a). In the embodiment of FIG. 16, the material, connecting structure and other constitutions of the boot 1 are the same as in the embodiment of FIGS. 1–3.

Embodiment of FIGS. 17, 18A, 18B, 18C

FIGS. 17, 18A, 18B and 18C show a split type boot according to a further embodiment of this invention.

The outline of this split type boot is illustrated. A protruding part 76 formed on the split end part 74 of a boot 61 is temporarily connected to a recessed part 77 formed on the other split end part 75 in the state where step-shaped locking or hook portions 762a, 772a formed on one side thereof are mutually engagingly locked to each other, and connected by welding, fusion or adhesion. The protruding part 76 is hooked only in one thickness directional side. An overlapping protruding part 773 formed on the non-hook side (inner side) of the recessed part 77 is connected extending over the inside surface 76a of the protruding part 76 and the inside surface of the split end part 74 continued thereto.

In FIG. 17, the whole body of the boot 61 is molded of a thermoplastic elastomer. The thermoplastic elastomer is abbreviated as TPE. Examples of the TPE include polyurethane thermoplastic elastomer (TPU), polyester thermoplastic elastomer (TPEE) and the like. As the most suitable example of such a thermoplastic elastomer, the one described with respect to the embodiment of FIGS. 1–3 can be adapted.

The boot 61 has a minor diameter mounting part 71 formed on one axial end (transverse direction of FIG. 17), a major diameter mounting part 72 formed on the other axial end, and a thin bellows part 73 formed between both the mounting parts 71, 72. The bellow part 73 is formed of repeatedly formed mountain parts 73a and valley parts 73b. Circumferentially extending band mounting grooves 71a, 72a are formed on the outside surfaces of the mounting parts 71, 72, respectively. Bands for fastening the mounting parts 71, 72 to, for example, the outside surfaces of the joint shaft and outer race of a universal joint are wound on the band mounting grooves 71a, 72a, respectively.

Figure 18A:
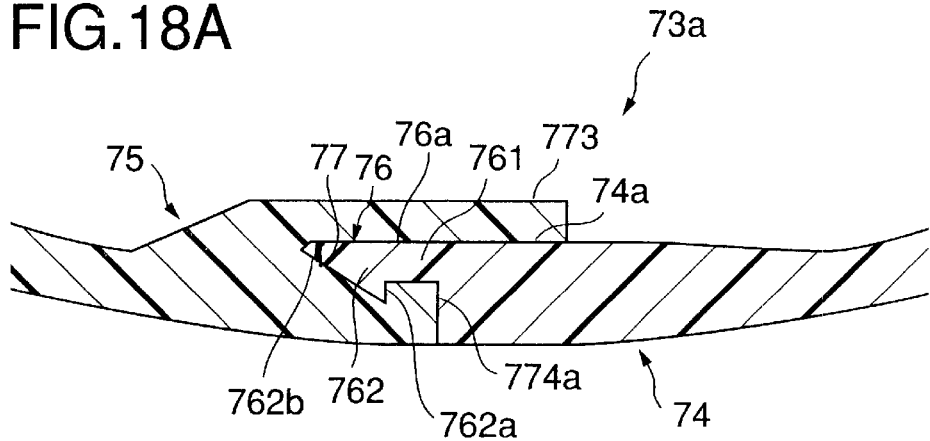
FIGS. 18A, 18B, and 18C are sectional views taken along lines A—A, B—B, and C—C in FIG. 17, respectively.
Figure 18B:
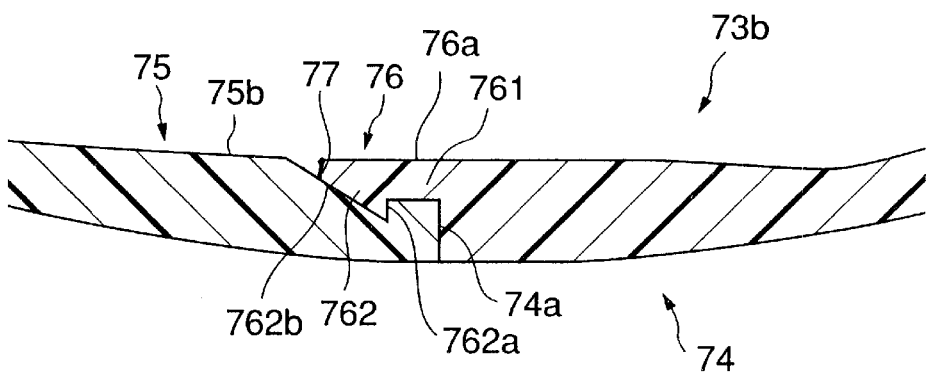
Figure 18C:
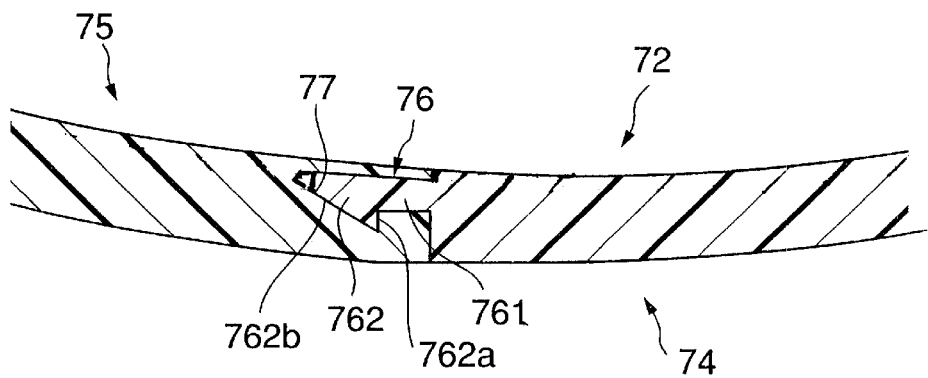
Figure 18D:
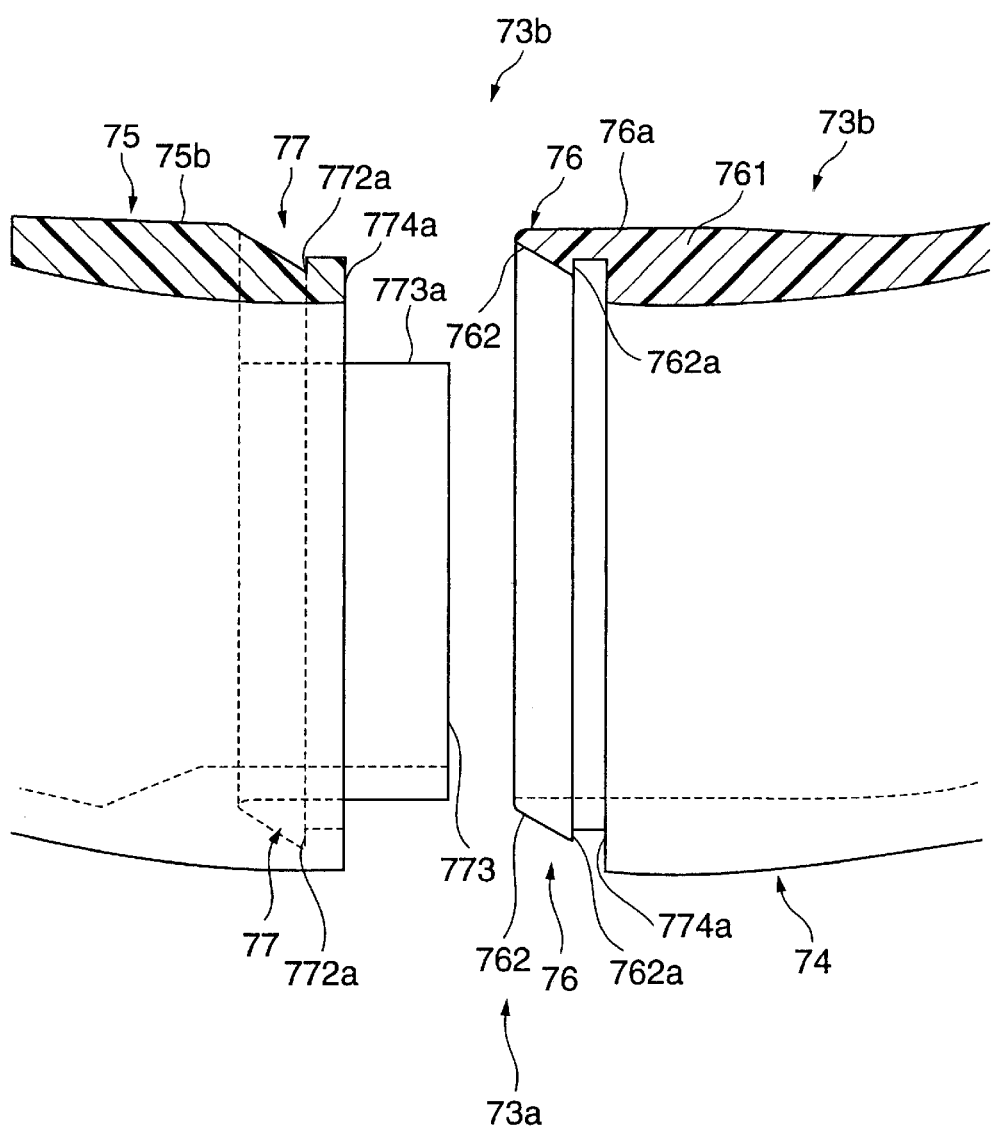

FIGS. 18A, 18B and 18C are sectional views taken along lines A—A, B—B and C—C in FIG. 17, respectively. FIG. 18D shows the relation of a pair of mountain part 73a and valley part 73b, and it is a sectional view corresponding to FIGS. 18A and 18B. In FIG. 18D, two split end parts 74, 75 are laid in the released state where they are mutually separated.

The boot 61 has split edges or split end parts 74, 75 cut or divided in one circumferential part and mutually opposed on both circumferential end sides thereof. The split end parts 74, 75 are opened before connection as shown in FIG. 18D.

The edge or end parts 74, 75 are differed in structure depending on the axial position of the boot 61.

In the mountain part 73a of the bellows part 73, as shown in FIGS. 18A and 18D, the edge or end parts 74, 75 are increased in thickness toward the inner side. A protruding part 76 is formed on the one split end part 74 of the boot 61 so as to protrude in the direction opposite to the other split end part 75. A groove-like recessed part 77 corresponding to the protruding part 76 is formed on the other split end part 75.

The protruding part 76 is formed of, as shown in FIGS. 18A and 18D, a neck part 761 protruded from the position closer to the inner side of the end surface 74a of the one split end part 74 in the boot 61, and a head part 762 formed at the tip of the neck part 761. The head part 762 has a step-shaped hook portion 762a standing up outward from the outside surface of the neck part 761, and an outside tapered surface 762b reduced in diameter from the periphery of the step-shaped hook portion 762a toward the tip.

An extension part 773 is formed on the inner side of the end part 75. Accordingly, the overlapping protruding part 773 extending longer than a base surface 774a is formed on the inner side of the end part 75. The outside surface of the extension part or overlapping protruding part 773 is formed in conformation to the inside surface 76a of the protruding part 76 and the inside surface of the one split end part 14 continued thereto. In the valley part 73b, however, the extension part 773 is not formed as shown in FIG. 18D, and it is interrupted in an end part 773a. Therefore, the valley part 73b is not thickened, different from the other part, and thus relatively flexible.

In the mountain part 73a of the bellows part 73, the outer sides of the end parts 74, 75 constitute a mutually continued surface.

The recessed part 77 has a sectional form corresponding to the above-mentioned protruding part 76.

In the valley part 73b of the bellows part 73, as shown in FIGS. 18B and 18D, the extension part or overlapping protruding part 773 is omitted in the part of the end part 773a as described above. However, the inside surface 76a of the protruding part 76 also constitutes a continued surface together with the inside surface 75b of the split end part 75.

In the valley part 73b of the bellows part 73, the circumferential sides of the end parts 74, 75 also constitute a mutually continued surface.

The recessed part 77 has a sectional form corresponding to the outside surface of the protruding part 76. The recessed part 77 does not have the part making contact with the inside surface 76a of the protruding part 76.

In the mounting part 72 of the boot, as shown in FIG. 18C, the thick parts of the extension part or overlapping protruding part 773 and the inside surface 76a of the protruding part 76 are omitted. Consequently, the boot mounting part 72 has substantially the same thickness over the whole outside body. The inside surfaces and outside surfaces of the split end parts 74, 75 constitute mutually continued flat surfaces.

The protruding part 77 has a sectional form corresponding to the protruding part 76.

In FIGS. 17A–17C, the upper side corresponds to the inner side of the bellows part 73.

Effect of the Invention

This invention has the following effects.

When the opposed split end parts of the boot are mutually engaged and integrally connected by mutual hooking of the protruding part and recessed part, a large connecting area can be easily ensured by the overlapping protruding part. Further, the connecting strength can be enhanced, and excellent sealing property can be provided.

When the protruding part is set to the form to be hooked with the recessed part on one thickness side thereof, the split end parts can be relatively thinned. The responsiveness in repeated bending and stretching deformation can be enhanced, and the fatigue durability can be also improved.

When the mounting parts on both the axial ends of the boot are mounted on the outside surface of a counter member such as universal joint through packings, the sealing property in the mounting parts can be improved.

In the manufacture of the boot, a troublesome work of precisely mounting fasteners on the opposed surfaces of the open part can be omitted. The manufacture of the boot can be thus facilitated.

The mounting of the boot can be performed only by mounting a heating element on the outer surface of the open part to heat the heating element. During the welding work, the person in charge can leave the working site. The connecting work of the open part of the boot or the mounting work of the boot can be facilitated.

When the material of the boot is a polyurethane thermoplastic elastomer, excellent connecting property by welding can be provided. The welding can be terminated in a short time.

When an amorphous bag is used, the deformability following the irregularities of the bellows can be easily imparted to the heating body.

When the heating body is preliminarily irregularly formed, the heating body can be closely fitted to not only the protruding part of the bellows but also to the recessed part thereof. The temperature can be uniformly raised. The welding time can be shortened also from this point.

The weld connected open part is excellent in sealing property since the opposed surfaces are integrated together by welding. The work of separately applying a coating agent or sealant to the opposed surfaces can be omitted. The connecting work of the open part or the mounting work of the boot can be facilitated also from this point.

Further, since the weld-connected open part is freely deformed according to the deformation of the bellows part, the boot is excellent also in the deformation following property of the open part. The open part can be prevented from being broken in a short period, and the durability can be improved.

TABLE 1

|  | Ex. 1 | Ex. 2 | Ex. 3 | Ex. 4 | C. Ex. 1 | C. Ex. 2 | C. Ex. 3 |
|---|---|---|---|---|---|---|---|
| Average Temp (° C.) of Boot Surface in Connecting Work End | 75 | 80 | 80 | 73 | 25 | 25 | 50–90 |
| Peel Test | ○ | ○ | ○ | ○ | x | Δ | ○ |
| State of Connected Part | ○ | ○ | ⊚ | ○ | x | Δ | ○ |

TABLE 2

|  | Ex. 1 | Ex. 2 | Ex. 3 | Ex. 4 | Ex. 5 | C. Ex. 1 | C. Ex. 2 | C. Ex. 3 | C. Ex. 4 |
|---|---|---|---|---|---|---|---|---|---|
| Peel Test | ○ | ○ | ○ | ○ | ○ | x | ○ | ○ | Δ |
| State of Connected Part | ⊚ | ⊚ | ⊚ | ⊚ | ○ | x | Δ | Δ | Δ |
| Easiness of application work | Δ | Δ | Δ | ○ | ○ | x | Δ | Δ | x |
| Viscosity of Welding Agent (mPa · s) | <10 | <10 | <10 | 500 | 500 | <5 | <10 | <10 | 20000 |

What is claimed is:

1. A boot comprising:
   first and second mounting parts formed at two axial ends,
   a bellows part extending between the first and second mounting parts, and
   a longitudinally extending open part having first and second split end parts and extending between the two axial ends,
   the first and second split end parts of the open part being mutually opposed,
   the first and second split end parts of the open part having a protruding part and a recessed part, respectively, extending between the two axial ends,
   the protruding part having a step-shaped hook, and the recessed part having a step-shaped hook corresponding in shape to the step-shaped hook of the protruding part so that the step-shaped hook of the protruding part is locked by the step-shaped hook of the recessed part in an unjoining direction in a hook position after the protruding part is positioned in the recessed part, whereby, after they are hooked to each other, unhooking them in the unjoining direction is avoided,
   an overlapping extending part protruding from the recessed part so that the overlapping extending part guides the protruding part when the protruding part is inserted into the recessed part,
   the step-shaped hook of the protruding part being within the recessed part when the step-shaped hook of the protruding part is locked by the step-shaped hook of the recessed part,
   wherein, when the step-shaped hook of the protruding part is locked by the step-shaped hook of the recessed part, the overlapping extending part covers the recessed part and the protruding part,
   the protruding part and the overlapping extending part being formed only at each inner peripheral side of the first and second split end parts so that, when the step-shaped hook of the protruding part is locked by the step-shaped hook of the recessed part, the inner peripheral side bulges inwardly, but an outer peripheral side of each of the first and second split end parts does not bulge outwardly,
   the outer peripheries of the first and second split end parts being arranged at a same level in the hook position,
   wherein all of the first and second mounting parts, the first and second split end parts, the bellows part and the overlapping extending part are integrally made of a same material.

2. The boot according to claim 1, wherein the outer surface of the first split end part and the outer surface of the second split end part are arranged at a same level without any step or bulging portion on the outer surfaces of the first and second split end parts when the protruding part is positioned in the recessed part.

3. The boot according to claim 1, wherein the overlapping extending part extends over the overlaps with the protruding part and the first split end part when the protruding part is positioned in the recessed part.

4. The boot according to claim 1, wherein an open part is formed by dividing one circumferential part and connected after putting the boot over a member, the open part is welded and connected.

5. The boot according to claim 4, wherein the open part is welded by heating of a heating body having self-heating property.

6. The method for making a boot comprising
   first and second mounting parts formed at two axial ends,
   a bellows part extending between the first and second mounting parts, and
   a longitudinally extending open part having first and second split end parts and extending between the two axial ends,
   the first and second split end parts of the open part being mutually opposed,
   the first and second split end parts of the open part having a protruding part and a recessed part, respectively, extending between the two axial ends,
   the protruding part having a step-shaped hook, and the recessed part having a step-shaped hook corresponding in shape to the step-shaped hook of the protruding part so that the step-shaped hook of the protruding part is locked by the step-shaped hook of the recessed part in an unjoining direction in a hook position after the protruding part is positioned in the recessed part, whereby, after they are hooked to each other, unhooking them in the unjoining direction is avoided, an overlapping extending part protruding from the recessed part so that the overlapping extending part guides the protruding part when the protruding part is inserted into the recessed part, the step-shaped hook of the protruding part being within the recessed part when the step-shaped hook of the protruding part is locked by the step-shaped hook of the recessed part, wherein, when the step-shaped hook of the protruding part is locked by the step-shaped hook of the recessed part, the overlapping extending part covers the recessed part and the protruding part, the protruding part and the overlapping extending part being formed only at each inner peripheral side of the first and second split end parts so that, when the step-shaped hook of the protruding part is locked by the step-shaped hook of the recessed part, the inner peripheral side bulges inwardly, but an outer peripheral side of each of the first and second split end parts does not bulge outwardly, the outer peripheries of the first and second split end parts being arranged at a same level in the hook position, wherein all of the first and second mounting parts, the first and second split end parts, the bellows part and the overlapping extending part are integrally made of a same material, said method comprising the steps of
putting the boot over a member,
thereafter setting a heating element having self-heating property to an open part of the boot, and
welding the open part.

7. The method according to claim 6, wherein a welding agent provided on the open part is heated by the heating element so that the open part is welded.

8. The method according to claim 7, wherein the welding agent is applied to one or two surfaces of the open part so as to weld and join the surfaces together.

9. The method according to claim 8, wherein the welding agent includes at least one of dimethylformamide, tetrahydrofuran, toluene, ethyl acetate, methyl ethyl ketone, acetone, cyclohexanone, dichloromethane, N-methyl-2-pyrolidone, and dibutyl ether.

10. The method according to claim 7, wherein the welding agent consists of a solvent for dissolving a thermoplastic elastomer.

11. The method according to claim 6, wherein the open part is formed by dividing one circumferential part of the boot, and thereafter a welding agent is applied to the open part and is heated by the heating device so that the open part is welded.

12. The method according to claim 11, wherein the heating device is deformable, and the heating device includes an amorphous bag containing a heating component.

13. The method according to claim 11, wherein the heating device has a bellows-form corresponding to a bellows-form of the boot so that the heating device is closely fitted to the open part along the bellows-form of the boot.

* * * * *